(12) United States Patent
Nakajima et al.

(10) Patent No.: US 7,446,970 B2
(45) Date of Patent: Nov. 4, 2008

(54) MAGNETIC HEAD ASSEMBLY, MAGNETIC DISK DRIVE AND POSTURE CONTROL METHOD FOR MAGNETIC HEAD SLIDER

(75) Inventors: Hiroyoshi Nakajima, Shatin (HK); Masashi Shiraishi, Shatin (HK)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 11/220,646

(22) Filed: Sep. 8, 2005

(65) Prior Publication Data
US 2006/0056096 A1  Mar. 16, 2006

(30) Foreign Application Priority Data
Sep. 14, 2004 (JP) .............................. 2004-267175
Sep. 14, 2004 (JP) .............................. 2004-267176

(51) Int. Cl.
*G11B 21/02* (2006.01)
*G11B 21/24* (2006.01)
(52) U.S. Cl. .................... 360/75; 360/78.05; 360/294.7
(58) Field of Classification Search .............. 360/234.4, 360/274
See application file for complete search history.

(56) References Cited

U.S. PATENT DOCUMENTS

| 4,605,977 | A | * | 8/1986 | Matthews | ................. | 360/234.7 |
|---|---|---|---|---|---|---|
| 5,021,906 | A | * | 6/1991 | Chang et al. | ............. | 360/235.1 |
| 6,344,949 | B1 | * | 2/2002 | Albrecht et al. | .......... | 360/236.5 |
| 6,376,964 | B1 | * | 4/2002 | Young et al. | ................. | 310/311 |
| 6,473,259 | B1 | * | 10/2002 | Kuo et al. | ...................... | 360/75 |
| 6,624,984 | B2 | * | 9/2003 | Lewis et al. | .............. | 360/294.7 |
| 6,757,120 | B2 | * | 6/2004 | Minoshima et al. | .......... | 360/31 |
| 6,950,266 | B1 | * | 9/2005 | McCaslin et al. | ............. | 360/75 |
| 6,972,919 | B2 | * | 12/2005 | Suk | .............................. | 360/75 |
| 6,999,265 | B1 | * | 2/2006 | Schreck et al. | ................ | 360/75 |
| 2003/0151854 | A1 | * | 8/2003 | Lee | .......................... | 360/234.6 |
| 2004/0125510 | A1 | * | 7/2004 | Yang et al. | ............... | 360/294.4 |
| 2006/0023338 | A1 | * | 2/2006 | Sharma et al. | ................ | 360/75 |
| 2006/0050442 | A1 | * | 3/2006 | Yao et al. | ................. | 360/294.4 |

FOREIGN PATENT DOCUMENTS

| JP | 5-036035 | 2/1993 |
|---|---|---|
| JP | 5-159262 | 6/1993 |
| JP | 2002343049 A | * 11/2002 |

OTHER PUBLICATIONS

English Language Abstract of JP 5-036035, Feb. 12, 1993.
English Language Abstract of JP 5-159262, Jun. 25, 1993.

* cited by examiner

*Primary Examiner*—Jason C Olson
(74) *Attorney, Agent, or Firm*—Greenblum & Bernstein, P.L.C.

(57) ABSTRACT

To realize stable reading/writing of data by making a positioning control of a magnetic head slider highly accurate. There are provided a magnetic head assembly including: a magnetic head slider for reading/writing of data with respect to a rotating magnetic disk; a suspension for supporting the magnetic head slider; and an air flow regulating device for regulating the air flow amount flown in between the magnetic disk and the magnetic head slider along with the rotation of the magnetic disk.

27 Claims, 24 Drawing Sheets

FIG. 4A

|  | RADIUS (mm) | PITCH (urad) | FLYING HEIGHTS (nm) |
|---|---|---|---|
| OUTER PERIPHERY | 30 | 113.1 | 11.5 |
| INTERMEDIADE PERIPHERY | 24 | 124.3 | 12.2 |
| INNER PERIPHERY | 17 | 127.7 | 12.6 |

FIG. 4B

|  | RADIUS (mm) | PITCH (urad) | GapFH (nm) |
|---|---|---|---|
| OUTER PERIPHERY | 30 | 128.2 | 213.1 |
| INTERMEDIADE PERIPHERY | 24 | 141.4 | 217.0 |
| INNER PERIPHERY | 17 | 141.5 | 217.4 |

FIG. 4C

|  | RADIUS (mm) | PITCH (urad) | FLYING HEIGHTS (nm) |
|---|---|---|---|
| OUTER PERIPHERY | 30 | 818.5 | 810.7 |
| INTERMEDIADE PERIPHERY | 24 | 742.6 | 647.7 |
| INNER PERIPHERY | 17 | 608.7 | 402.2 |

- 2
- 24
- 3
- MAGNETIC HEAD ELEMENT 21
- 22 MAIN RECESS PLANE
- 23 SHALLOW RECESS PLANE
- 24 ABS PLANE

MAGNETIC HEAD ASSEMBLY, MAGNETIC DISK DRIVE AND POSTURE CONTROL METHOD FOR MAGNETIC HEAD SLIDER

BACKGROUND OF THE INVENTION

1. Field of the Invention

The present invention relates to a magnetic head assembly and a magnetic disk drive, and in particular, to a magnetic head assembly and a magnetic disk drive for controlling the posture of a magnetic head slider with respect to the magnetic disk surface. Further, the present invention relates to a posture control method for a magnetic disk slider.

2. Related Art

Along with an achievement in high-density recording and large capacity of a magnetic disk drive in recent years, low flying of a magnetic head slider has been developed. In order to realize such low flying, technical development relating to an ABS and a suspension has been promoted. For example, Japanese Patent Application Laid-open No. 5-36035 discloses art for reducing the weight of the tip part of a flexure so as to realize high accuracy in positioning. Further, Japanese Patent Application Laid-open No. 5-159262 discloses art for improving the rigidity of a gimbal so as to realize high accuracy in positioning.

Moreover, in a manufacturing process of a magnetic head assembly or the like, in a state where a magnetic head slider is mounted on a suspension, a tilted degree of the magnetic head slider in a pitch direction or a roll direction with respect to the reference surface is measured and the tilted degree is strictly managed to thereby realize low flying.

In recent years, however, high-density recording and large capacity of a magnetic disk drive has been achieved increasingly, so more stable low flying is demanded. Therefore, it is difficult to keep the desired flying amount securely with the art described above. In particular, since the art described above is not for controlling the flying height positively, it is impossible to set the flying height of each device appropriately after assembled into a disk drive. That is, there may be problems that defective reading or writing of data with respect to a disk is caused due to the flying height being too high, or a clash is caused due to the flying height being too low.

On the other hand, although low flying of a magnetic head slider is demanded as described above, it is difficult to detect the flying height. In contrast, if the flying height of a magnetic head slider can be detected, it is possible to improve the quality of products by inspecting the flying height at the time of shipment and taking defective products out according to the inspection result, for example. Alternatively, the detected flying height may be used for properly controlling the flying height of the magnetic head slider, whereby problems of degrading in the accuracy of reading or writing of data and a clash may be solved effectively.

In view of the above, an object of the present invention is to realize stable reading and writing of data by achieving high accuracy in positioning with respect to a magnetic disk.

In order to achieve the object, one mode of the present invention is a magnetic head assembly comprising: a magnetic head slider for reading and writing information with respect to a rotating magnetic disk; a suspension for supporting the magnetic head slider; and an air flow regulating device for regulating an air flow amount flown in between the magnetic disk and the magnetic head slider along with the rotation of the magnetic disk.

The air flow regulating device includes an extendable/contractible driving device which extends or contracts on the basis of a height from a mounting face, onto the suspension, of the magnetic head slider to a face facing the magnetic disk. In particular, the extendable/contractible driving device extends or contracts on the basis of the height of the main recess plane of the magnetic head slider. Further, the extendable/contractible driving device includes a piezoelectric device.

According to the invention described above, a piezoelectric device which can be controlled to extend or contract with high accuracy is used as an extendable/contractible driving device, and on the basis of the height of the magnetic head slider, the extendable/contractible driving device is controlled to extend or contract so as to protrude or retract from the slider. This enables to regulate the air flow amount, flown in between the magnetic head slider and the disk, for flying the magnetic head, so the extendable/contractible driving device can be operated as an air amount regulating device. By regulating the air flow amount, the dynamic pressure for flying the slider, generated by the flown air, changes, and also the pressing force of the flown air itself for pressing the front end part of the magnetic head slider mounted on the suspension changes as well. Accordingly, the flying height of the magnetic head slider and the posture angle in a pitch direction can be regulated, so that reading/writing processing of signals can be performed with high accuracy by making the distance to the disk closer. In contrast, with the flying height being high with respect to the disk, a clash caused due to a too close distance can be suppressed effectively. Note that the amount of flown air may be regulated by a device other than the extendable/contractible driving device.

In the magnetic head assembly of the configuration described above, the extendable/contractible driving device is preferably provided adjacently on the air inflow side of the magnetic head slider, as an air flow regulating device. Thereby, the size of the air inflow port can be controlled on the basis of the height of the magnetic head slider, enabling to control the amount of flown air easily and securely. For example, although the operation differs depending on the form of the floating surface (flying surface) of the magnetic head slider, it is possible generally to control such that the amount of flown air becomes large and the flying height increases when the extendable/contractible driving device contracts, and the amount of flown air becomes small and the flying height decreases when the extendable/contractible driving device extends.

Further, the extendable/contractible driving device extends or contracts corresponding to the flying height of the magnetic head slider with respect to the magnetic disk. Thereby, if the flying height of the magnetic head slider is low so that a clash may be cause, it is possible to prevent a clash by regulating the amount of flown air so as to increase the flying height. On the other hand, if the flying height is too high so that the accuracy of reading/writing of information is low, it is possible to realize reading/writing of information with high accuracy by regulating the amount of flown air so as to decrease the flying height to thereby realize low flying.

Further, a magnetic disk drive is also provided in the present invention. As a mode thereof, a magnetic disk drive comprises a magnetic head assembly including: a magnetic head slider for reading and writing information with respect to a rotating magnetic disk; and a suspension for supporting the magnetic head slider, and has an air flow regulating device for regulating the air flow amount flown in between the magnetic disk and the magnetic head slider along with rotation of the magnetic disk.

The air flow regulating device includes: an extendable/contractible driving device which is provided adjacently on the air inflow side of the magnetic head slider and extends or contracts on the basis of a height from a mounting face, onto the suspension, of the magnetic head slider to a face facing the magnetic disk; and an extension/contraction controlling device for controlling extending/contracting operation of the extendable/contractible driving device. The extension/contraction controlling device controls the extending/contracting operation of the extendable/contractible driving device on the basis of the height of the main recess plane of the magnetic head slider.

Further, the extension/contraction controlling device controls the extendable/contractible driving device to extend or contract based on posture information indicating the posture of the magnetic head slider with respect to the disk. Here, the posture information is the flying height of the magnetic head slider with respect to the magnetic disk.

Further, the magnetic disk drive includes: a readout signal detecting device for detecting a readout signal, for example, an output voltage value thereof, from the magnetic disk in the magnetic head slider; and a flying state identifying device for identifying the flying state of the magnetic head slider with respect to the magnetic disk as the posture information, based on the readout signal detected.

According to this configuration, first, when data stored on the magnetic disk is read out in the magnetic head slider, as a readout signal, an output voltage value thereof is detected for example. By inspecting the readout signal, it is possible to identify the flying state of the magnetic head slider easily and appropriately. For example, it is possible to detect such information as whether the magnetic head slider flies at a position capable of reading/writing of data appropriately with respect to the magnetic disk, according to presence or absence of the output voltage value and its intensity. Then, according to the flying state of the magnetic head slider detected, the air flow amount flown in between the magnetic head slider and the magnetic disk, generating the flying force in the magnetic head slider as described above, is controlled to be regulated. Thereby, the flying height of the magnetic head slider can be regulated, so it is possible to perform reading/writing of data with high accuracy.

Further, as a configuration for regulating the flying height of the magnetic head slider, the magnetic disk drive includes a slider flying height controlling device for controlling the flying height of the magnetic head slider according to the identified flying state of the magnetic head slider. The slider flying height controlling device includes a slider distance controlling device for controlling a distance from the suspension supporting the magnetic head slider to the surface of the magnetic disk according to the identified flying state of the magnetic head slider to thereby control a distance from the magnetic head slider to the surface of the magnetic disk. Thereby, according to the detected flying state of the magnetic head slider, the distance between the magnetic head slider and the magnetic disk is controlled by the slider distance controlling device so as to control the gram load of the magnetic head slider, whereby it is possible to regulate the magnetic head slider to have an appropriate flying height.

Further, the magnetic disk drive includes a reference data storing device for storing reference data which has been determined beforehand and is compared with the readout signal, and the flying state identifying device compares the readout signal detected with the reference data, and according to the comparison result, identifies the flying state of the magnetic head slider as the posture information. Alternatively, the magnetic disk drive includes a map data storing device for storing map data indicating the relationship between the readout signal and the flying height of the magnetic head slider, and the flying state identifying device identifies the flying height of the magnetic head slider with respect to the magnetic disk based on the readout signal detected and the map data.

Thereby, it is possible to identify the flying state of the magnetic head slider easily and accurately by setting beforehand, as reference data, values corresponding to readout signals in a flying state where reading/writing of data can be performed accurately and readout signals in an inappropriate flying state, and comparing the readout signal detected with the reference data. In particular, it is possible to identify the flying height easily and with high accuracy by preparing map data in which the relationship between readout signals and the flying heights are set beforehand through experimentations or logical calculations and matching the detected readout signal with them.

Further, the present invention also provides a posture control method for a magnetic head slider. One mode thereof is a posture control method characterized as to regulate the air flow amount flown in between the magnetic disk and the magnetic head slider along with the rotation of the magnetic disk according to the posture of the magnetic head slider. The posture is identified in such a manner that, as a readout signal, an output voltage value thereof is detected from the magnetic disk in the magnetic head slider, and the posture is identified based on the readout signal detected.

Another mode of a posture control method for a magnetic head slider is characterized as to regulate the air flow amount flown in between the magnetic disk and the magnetic head slider along with the rotation of the magnetic disk according to the driving state of the magnetic disk drive.

Further, another mode of a magnetic head assembly of the present invention comprises: a magnetic head slider for reading and writing information with respect to a rotating magnetic disk; a suspension for supporting the magnetic head slider; and an air flow right-and-left balance regulating device for regulating a right-and-left balance of the air flow flown in between the magnetic disk and the magnetic head slider along with the rotation of the magnetic disk.

In particular, the air flow right-and-left balance regulating device includes a plurality of extendable/contractible driving devices which extend and contract on the basis of the height from a mounting face, onto the suspension, of the magnetic head slider to a face facing the magnetic disk and are arranged in parallel toward a flowing direction of air flown into the magnetic head slider. Further, the plurality of extendable/contractible driving devices extend or contract independently, according to the roll of the magnetic head slider.

With the configuration described above, by extending or contracting each of the extendable/contractible driving devices positioned separately in parallel, the air flow amount flown in between the magnetic head slider and the magnetic disk can be changed by each mounting row of the extendable/contractible driving device in a right and left direction of the magnetic head slider. Thereby, the flying height in the right and left direction can be changed, so the posture in a roll direction of the magnetic head slider can be controlled as well. Accordingly, by extending or contracting each extendable/contractible driving device according to the current rolling state of the magnetic head slider, it is possible to control the magnetic head slider to have a posture optimum for performing reading/writing of information and capable of suppressing a clash.

Further, another mode of the magnetic disk drive comprises a magnetic head assembly including: a magnetic head slider for reading and writing information with respect to a rotating magnetic disk; a suspension for supporting the magnetic head slider, and has an air flow right-and-left balance regulating device for regulating a right-and-left balance of the air flow flown in between the magnetic disk and the magnetic head slider along with the rotation of the magnetic disk.

The air flow right-and left balance regulating device includes: a plurality of extendable/contractible driving devices which are provided adjacently on the air inflow side of the magnetic head slider, and extend or contract on the basis of the height from a mounting face, onto the suspension, of the magnetic head slider to a face facing the magnetic disk, and are arranged in parallel toward a flowing direction of air flown into the magnetic head slider; and an extension/contraction controlling device for controlling extending/contracting operations of the plurality of extendable/contractible driving devices independently.

The extension/contraction controlling device controls the plurality of extendable/contractible driving devices independently, based on posture information indicating the posture of the magnetic head slider with respect to the magnetic disk. Further, the posture information is a roll of the magnetic head slider.

The magnetic disk drive of the configuration described above is capable of performing posture control of the magnetic head slider similarly to the case of the magnetic head assembly described above. In particular, by controlling the extendable/contractible driving device to extend or contract by the control device actively, positioning control of the magnetic head slider can be performed with high accuracy according to the operating state of the magnetic disk drive, so it is possible to stabilize the operational state.

EFFECTS OF THE INVENTION

The present invention is configured and works as described above. According to the present invention, the extendable/contractible driving device provided together with the magnetic head slider is controlled to extend or contract, whereby the air amount flown in between the magnetic head slider and the disk can be regulated, and due to the effect of the flown air, the flying height and the posture angle of the magnetic head slider can be regulated. Accordingly, it is possible to perform reading/writing processing of signals with high accuracy by making the distance to the magnetic disk close, and also to suppress a clash effectively by controlling to keep an appropriate flying height. In particular, by performing the control described above, it is possible to improve inaccurate processing or improper assembling of, for example, the suspension supporting the magnetic head slider even after the magnetic disk drive is manufactured. Therefore, the present invention can achieve an excellent effect of realizing high accuracy in positioning control of the magnetic head slider, which could not be achieved conventionally.

Further, there is no need to assemble an additional sensor or the like to the magnetic disk drive, and readout signals which are detected typically are used. Thereby, it is possible to detect the flying state of the magnetic head slider accurately with simple method and configuration. Thereby, the manufacturing cost at the time of inspection and manufacturing can be reduced, and by utilizing the flying state information detected and by controlling the flying height of the magnetic head slider thereafter, it is possible to improve the accuracy of reading/writing of data of the magnetic head slider. This provides an excellent effect which could not be achieved conventionally.

BRIEF DESCRIPTION OF THE DRAWINGS

FIGS. 1A and 1B show a partial configuration of a suspension in an embodiment 1, in which FIG. 1A is a plan view showing the tip area, and FIG. 1B is a sectional view taken along the line A-A in FIG. 1A;

FIGS. 3A and 3B show an exemplary form of the floating surface (flying surface) of the magnetic head slider in the embodiment 1, in which FIG. 3A is a plan view of the floating surface and FIG. 3B is a sectional view taken along the line A'-A' in FIG. 3A;

FIGS. 4A, 4B and 4C show simulation results indicating flying heights of the magnetic head slider when the actuator is extended/contracted in the embodiment 1;

FIGS. 7A, 7B and 7C show an exemplary form of a floating surface of a magnetic head slider in embodiments 2 and 3, in which FIG. 7A is a plan view of the floating surface, and FIGS. 7B and 7C are sectional views taken along the line B-B in FIG. 7A, explaining the operation of a suspension when an actuator is extended/contracted, respectively;

FIGS. 11A, 11B and 11C illustrate contents of data stored on the memory disclosed in FIG. 10, in which FIG. 11A is a graph showing an example of height map data, and FIGS. 11B and 11C are illustrations showing the relationship between the height map data and the magnetic head slider;

FIGS. 14A and 14B illustrate a flying state of the magnetic head slider, in which FIG. 14A is a perspective view and FIG. 14B is a view seen from a side thereof;

FIGS. 18A and 18B show the configuration of a magnetic head assembly in the embodiment 4, in which FIG. 18A is a plan view and FIG. 18B is a partial sectional view seen from a side;

FIGS. 22A and 22B illustrate an example of a suspension in an embodiment 5, in which FIG. 22A is a plan view and FIG. 22B is a sectional view taken along the line C-C in FIG. 22A;

PREFERRED EMBODIMENTS OF THE INVENTION

The present invention is characterized as being provided with an extendable/contractible actuator together with a magnetic head slider. Further, it is also characterized in that extension/contraction of the actuator is controlled corresponding to the position and posture of the magnetic head slider with respect to a magnetic disk. Along with it, the present invention is also characterized in the configuration and the method of detecting the posture of the magnetic head slider.

The object of the present invention is to realize stable reading and writing of data by regulating the air amount flown in between the magnetic head slider and the magnetic disk, and controlling the flying height and the posture angle of the magnetic head slider. Hereinafter, a configuration and operation for achieving the above-mentioned object will be explained in detail with reference to each embodiment. In particular, in an embodiment 1, the basic configuration and operation of the present invention will be explained, and in other embodiments, configurations and operations will be explained in more detail. Note that in embodiment 4, a configuration and operation for detecting the posture of a magnetic head slider will be explained.

Embodiment 1

Figure 1A:
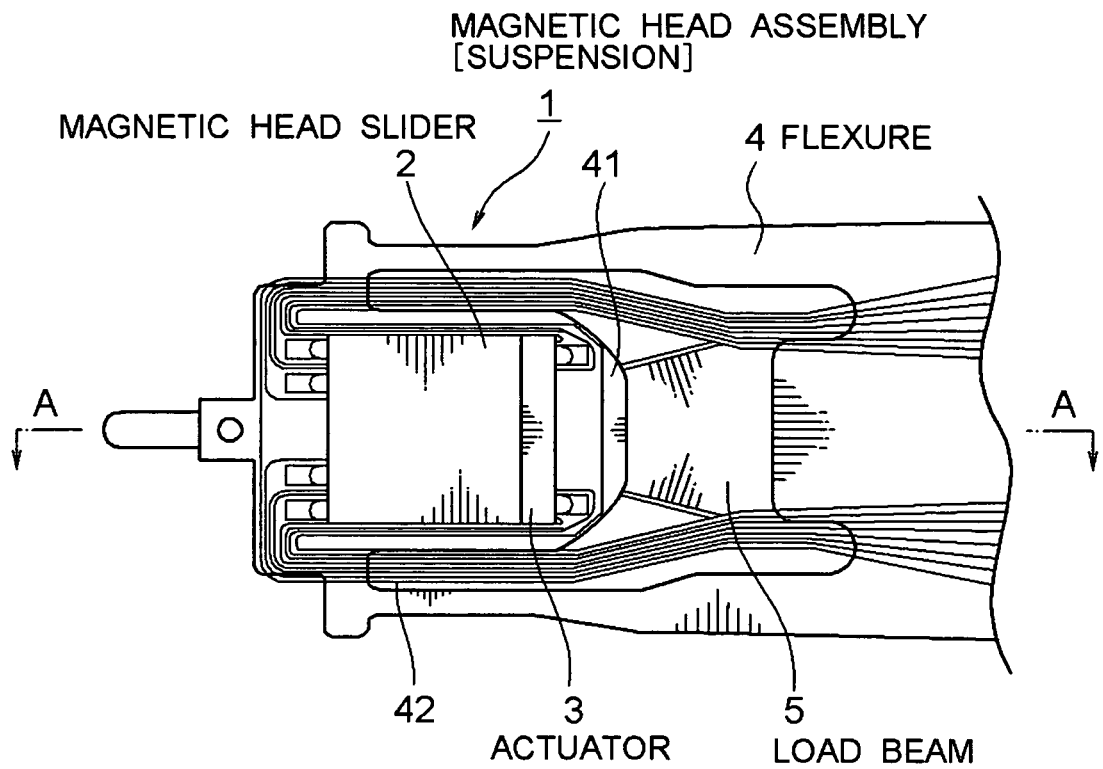
Figure 1B:
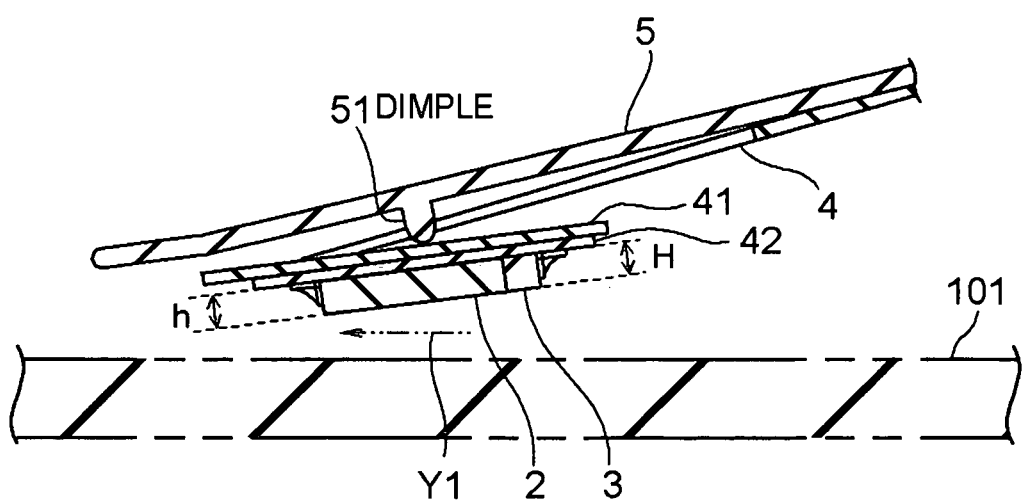
Figure 2A:
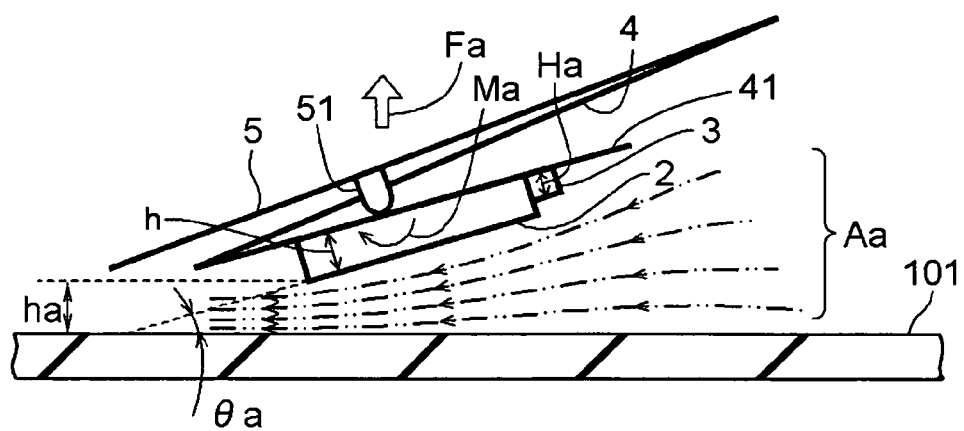
FIGS. 2A, 2B and 2C are illustrations showing the operational principle of the suspension disclosed in FIGS. 1A and 1B, for explaining operation of the suspension when an actuator is extended/contracted, respectively.
Figure 2B:
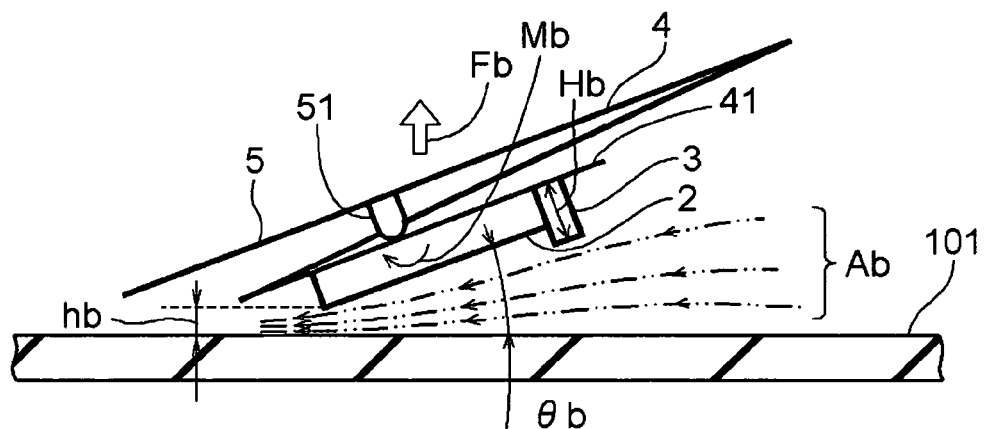
Figure 2C:
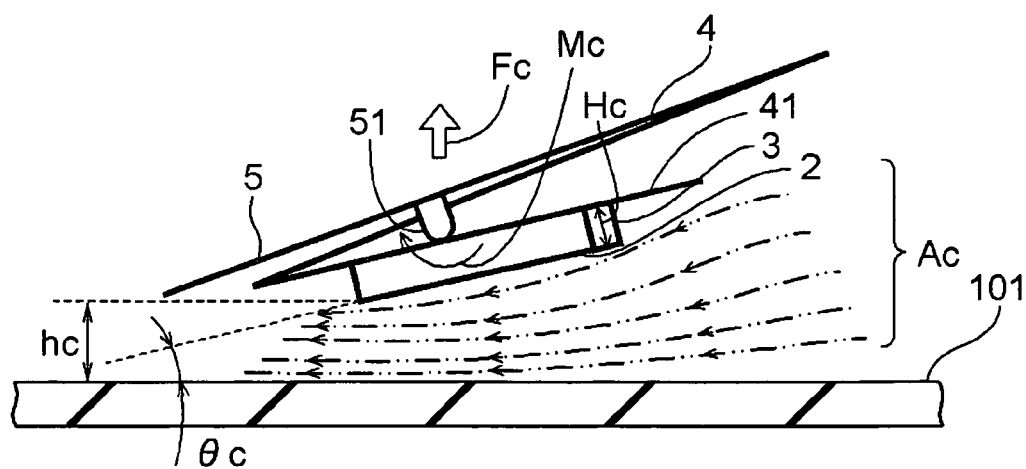
Figure 3A:
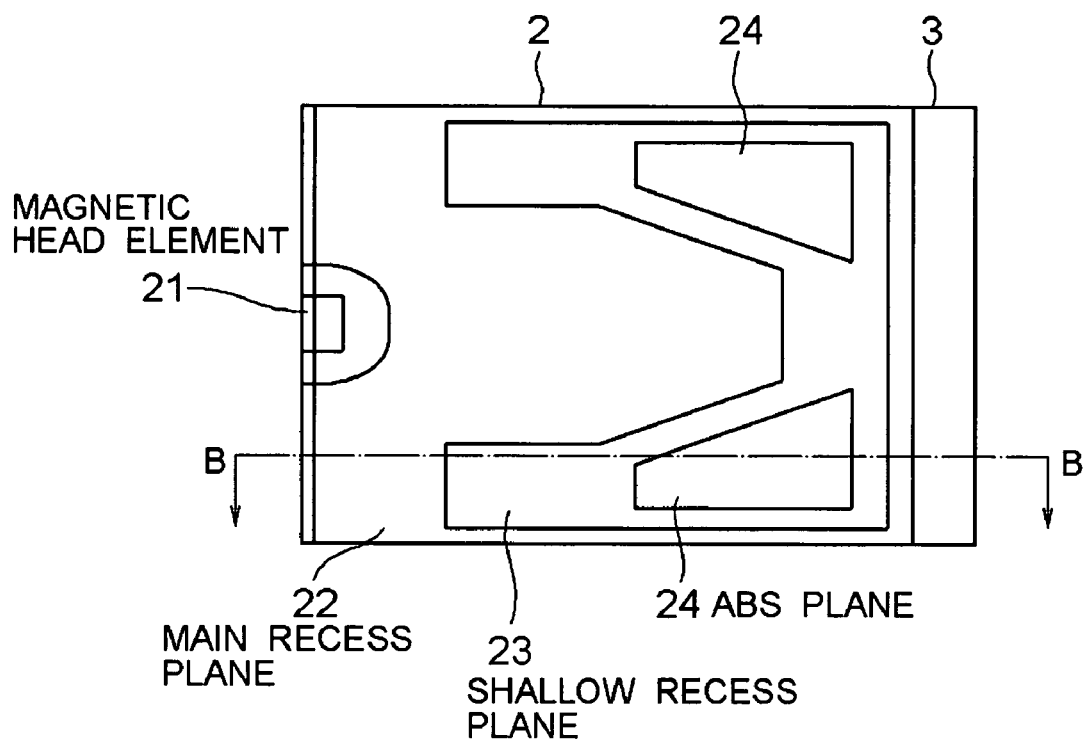
Figure 3B:
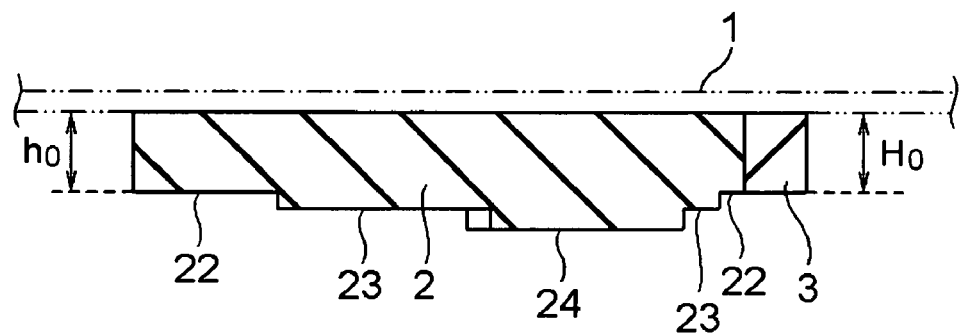
Figure 5A:
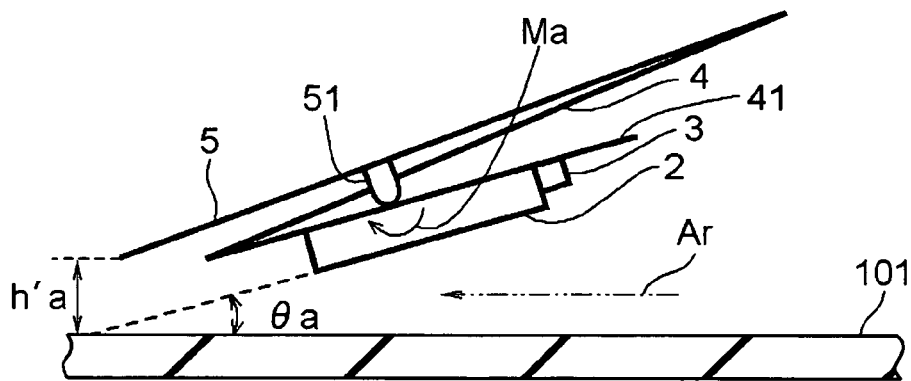
FIGS. 5A, 5B and 5C are illustrations showing the operational principle of a suspension which is a modification of the suspension in the embodiment 1, for explaining operation of the suspension when an actuator is extended/contracted, respectively.
Figure 5B:
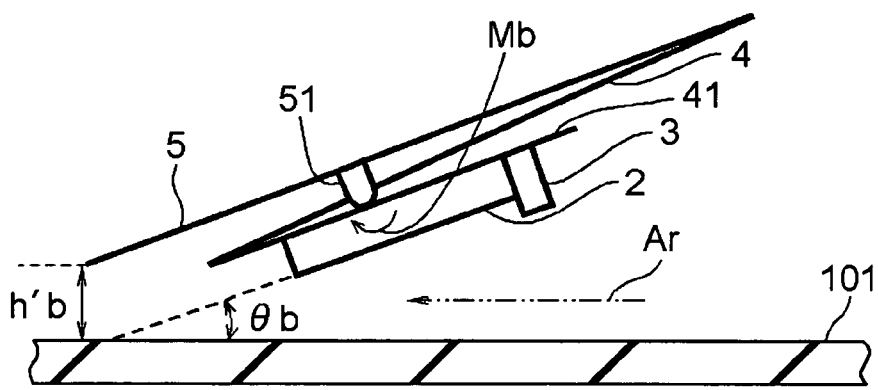
Figure 5C:
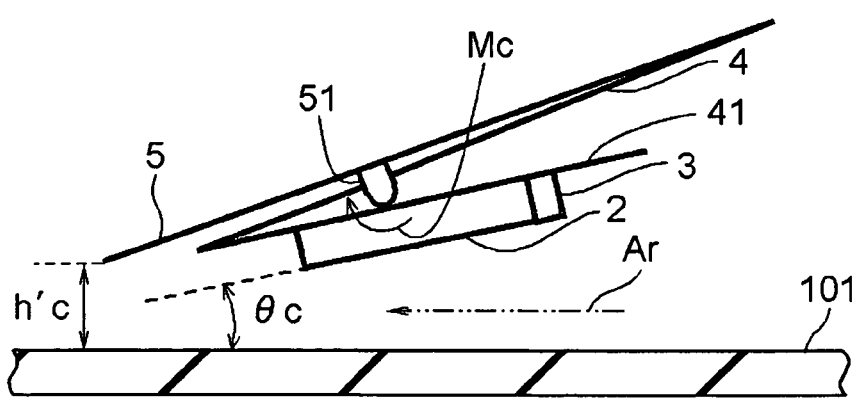

A first embodiment of the present invention will be explained with reference to FIGS. 1A to 5C. FIGS. 1A and 1B show the configuration of a magnetic head assembly, and FIGS. 2A to 2C illustrate a flying action of a magnetic head slider. FIGS. 3A and 3B show a form of the flying surface (floating surface) of the magnetic head slider, and FIGS. 4A to 4C show simulation results indicating the flying heights of the magnetic head slider when the height of the actuator is changed. FIGS. 5A to 5C show a modification of the magnetic head assembly.

(Configuration)

The present invention is characterized in a suspension 1 (magnetic head assembly) supporting a magnetic head slider 2 shown in FIG. 1. Hereinafter, the configuration of the suspension 1 will be explained in detail. Note that FIGS. 1A and 1B show the tip part of the suspension 1, in which FIG. 1A is a plan view showing the configuration of the tip part of the suspension, and FIG. 1B is a sectional view taken along the line A-A in FIG. 1A.

As shown in FIG. 1A, the suspension 1 includes a metallic (e.g., stainless) flexure 4 having the elasticity for mounting the magnetic head slider 2 to the tip area (left end part in FIG. 1A), a metallic load beam 5 having the elasticity for fixing and supporting the flexure 4, and a metallic base plate (not shown) provided to the base part of the load beam 14. The base plate (not shown) is fixedly supported by an arm part 103 disclosed in FIG. 4.

The flexure 4 has a groove cut out in a substantially U-shape, and has a gimbal part 41 with spring characteristics due to the tip part being connected. On the gimbal part 41, a magnetic head slider 2 is mounted. The gimbal part 41 is supported in such a manner that the face opposite the mounting face of the magnetic head slider 2 is supported at a point with a dimple 51 (protruding member) formed on the load beam 5, as shown in FIG. 1B. Thereby, the gimbal part 41 on which the magnetic head slider 2 is fixed is freely rotatable in a pitch direction and in a roll direction, whereby the gimbal part 41 works to absorb the force applied to the magnetic head slider 2 from the outside and to control the posture of the magnetic head slider 2 stably.

On the flexure 4, a wiring member 42 formed by thin film patterning is provided in a longitudinal direction. More specifically, the wiring member 42 consists of a polyimide layer formed on the flexure 4 made of stainless or the like, and of lead conductors made of copper layer formed by being patterned on the polyimide layer. Four of the lead conductors have terminals on the tip side (left side of FIG. 1A) of the flexure 4, and are connected with the magnetic head slider 2. Further, two of the lead conductors have terminals on the side opposite the tip side, that is, near the groove forming the gimbal part 41, and are connected with an actuator 3 described later. Note that the wiring member 42 may be formed by laminating them on the flexure 4 directly, or by affixing those having been laminated to the flexure 4.

The magnetic head slider 2 fixed to the gimbal part 41 of the flexure 4 has a magnetic head element (not shown) for performing reading and writing of data to a magnetic disk 101, and is formed in an almost rectangular parallelepiped. The magnetic head element is formed on the front end side (left side of FIG. 1A) of the magnetic head slider 2, and the magnetic head slider 2 is mounted on the flexure 4 so as to face the surface of the disk 101 (see FIG. 1B). Accordingly, it is configured that the tip side is made to be in a low flying state from the disk 101 such that the magnetic head element comes closer to the surface of the disk 101 when reading or writing data.

Further, in the present invention, an extendable/contractible actuator 3 is provided on the flexure 4 so as to be adjacent the magnetic head slider 2. More specifically, the actuator 3 is provided so as to protrude in a thickness direction of the magnetic head slider 2 from the flexure 4 to the surface of the magnetic disk 101. The actuator 3 is made of piezoelectric ceramic (piezoelectric device) such as PZT, for example, which is a member extending or contracting when a voltage is applied. Note that the actuator 3 is provided with a prescribed voltage signal required for extension/contraction, transmitted via prescribed control circuits and lead conductors, with an instruction from a controller mounted on a magnetic disk drive not shown.

However, the actuator 3 is not limited to be formed of the material described above, and its extending/contracting method is not limited to that described above. Any extendable/contractible driving device such as the actuator may be used.

The actuator 3 will be explained in more detail. The actuator 3 is provided on the gimbal part 41 of the flexure 4, and is mounted to be positioned on the groove side forming the gimbal part 41. More specifically, the actuator 3 is provided so as to contact or be adjacent to an end part (end part on the right side in FIG. 1A) opposite the tip side on which the magnetic head element of the magnetic head slider 2 is formed, as shown in FIG. 1A. The actuator 3 is formed to be an almost square pole, and its longitudinal direction is arranged along the end face of the contacting magnetic head slider 2. The length of the actuator 3 in the longitudinal direction is almost same as the width of the contacting magnetic head slider 2. Further, the protruding height H when mounted on the gimbal part 4 is almost same as the thickness h of the magnetic head slider 2, that is, the height from the mounting surface, onto the suspension 1, of the magnetic head slider 2 to the face facing the magnetic disk (see FIG. 1B). In particular, when the actuator 3 is provided together with the magnetic head slider 2 having a floating surface (flying surface, that is, ABS plane) described later, it is set to have the same height as the main recess plane. Since the floating surface of the magnetic head slider 2 takes various forms, the protruding height H is set corresponding thereto.

Further, the actuator 3 is configured so as to extend/contract in a thickness direction of the magnetic head slider 2. In FIG. 1A, the shown face of the actuator 3 extends/contracts in a vertical direction with respect to the sheet, and in FIG. 1B, the lower end face of the actuator 3 is configured so as to extend/contract in an up and down direction. In particular, in the present embodiment, with the thickness h of the magnetic head slider 2 (here, main recess plane) being the reference, the actuator 3 extends so as to protrude from the thickness h of the magnetic slider 2, or contracts so as to be shorter than the thickness h. Therefore, at the time of reading/writing operation of data of the magnetic head slider 2, the protruding end of the actuator 3 extends to a position protruding on the disk 101 side from the face of the magnetic head slider 2 facing the disk 101, or contracts to a position dented opposite to the disk 101 side from the face facing the disk 101 (see FIGS. 2A to 2C described later). In the following description, the height in an extending/contracting direction of the actuator 3 from the mounting face to the flexure to the protruding end is indicated as H. However, the extending/contracting operation of the actuator 3 is different depending on the form of the floating surface of the magnetic head slider 2.

The flexure 4 is fixedly supported by the load beam 5 as described above. The load beam 5 has the elasticity for pressing the magnetic head slider 2 in the disk 101 direction so as to stabilize the flying height. Accordingly, the magnetic head slider 2 mounted on the gimbal part 41 is pressed so as to contact the magnetic disk 101 by the load beam 5, but when the magnetic disk 101 rotates, air is flown in a direction shown by the arrow Y1 between the magnetic head slider 3 and the disk 101 surface, as shown in FIG. 1B. Such flown air causes a dynamic pressure to fly the slider 2. Thereby, a flying force exceeding the pressing force of the load beam 5 is generated in the magnetic head slider 2, and the load beam 5 is elastically deformed to warp upward, so that the magnetic head slider 2 flies with respect to the disk surface and is supported with a prescribed interval to the disk surface. Since the load beam 5 is provided with the protruding dimple 51 so as to press the gimbal part 41, the magnetic head slider 2, mounted on the gimbal part 41 and flying, is pressed to a position near the magnetic disk 101 surface.

Further, the load beam 5 is formed of a stainless steel sheet having the elasticity of a form in which the width thereof becomes narrower toward the tip, and the tip part serves as a part getting on the ramp 106 when unloaded.

When viewing the suspension 1 of the present embodiment loaded on the disk 101, the actuator 3, which is the characteristic of the present invention, is provided on a path of air flown in between the disk 101 and the magnetic head slider 2 on the flowing side of the flown air viewed from the magnetic head slider 2.

(Operation)

Next, the flying principle of the magnetic head slider 2 will be explained while taking into account extension/contraction of the actuator 3, with reference to FIGS. 2A to 2C. In these Figures, the tip part of the suspension 1 is shown by being simplified. Further, although the extension/contraction-controlled height H of the actuator 3 and a flying state of the magnetic head slider 2 differ depending on the form of the actual floating surface of the magnetic slider 2, as described in embodiments to be explained later, explanation will be given on the premise that, the height H of the actuator 3 is extension/contraction-controlled with the height h of the floating surface in a planer shape (main recess plane) being the reference, whereby the magnetic head slider 2 operates in the following manner logically.

FIG. 2A shows a case where the actuator 3 is controlled to contract, and the contracted end part thereof is retracted from the thickness of the magnetic head slider 2 (height Ha<h), viewed from the surface of the magnetic disk 101. In such a case, the size of the air inflow port between the magnetic head slider 2 and the magnetic disk 101 is not changed comparing with a case where the actuator 3 is not mounted. In such a state, when the magnetic disk 101 rotates, air of the amount shown by the reference sign Aa is flown in between the magnetic disk 101 and the magnetic head slider 2, and an appropriate dynamic force flying the magnetic head slider 2 upward is generated therebetween, whereby the magnetic head slider 2 is energized with a flying force shown by the reference sign Fa. Thereby, the load beam 5 is elastically deformed to warp upward, and the magnetic head slider 2 is held in a state of flying with respect to the disk 101. At this time, a pressing force to press the tip side of the magnetic head slider 2 obliquely upward is also energized by the flown air. Thereby, a rotational force, shown by the reference sign Ma, about the dimple 51 is generated in the magnetic head slider 2, whereby the tip part of the magnetic head slider 2 is in a state of flying appropriately with respect to the disk 101. As a result, in the case shown in FIG. 2A, the tip part of the magnetic head slider 2 is held in a state of flying at a height shown by the reference sign ha with respect to the magnetic disk 101, and the posture angle of the magnetic head slider 2 in a pitch direction with respect to the magnetic disk 101 is held at an angle shown by the reference sign θa.

Next, explanation will be given for a case shown in FIG. 2B. In FIG. 2B, the actuator 3 is controlled to extend so as to be in a state where the extended end part thereof protrudes to the disk 101 surface side, exceeding the thickness of the magnetic head slider 2 (main recess plane) (height Hb>h). In such a state, when the disk 101 rotates, air of the amount shown by the reference sign Ab is flown in between the disk 101 and the magnetic head slider 2. At this time, since the air inflow side is blocked with the extended portion of the actuator 3, the amount of the flowing air decreases comparing with the case shown in FIG. 2A (Ab<Aa). Accordingly, although a dynamic pressure to fly the magnetic head slider 2 upward is generated, the flying force Fb energized to the magnetic head slider 2 decreases comparing with the case shown in FIG. 2A (Fb<Fa). Further, since the amount of the flown air Ab is also small, the pressing force to press the tip side of the magnetic head slider 2 obliquely upward also decreases comparing with the case shown in FIG. 2A. Thereby, the rotational force shown by the reference sign Mb about the dimple 51 in the magnetic head slider 2 also decreases (Mb<Ma). As a result, in the case shown in FIG. 2B, the tip part of the magnetic head slider 2 is held in a state of flying at a height shown by the reference sign hb which is lower than the case shown in FIG. 2A (hb<ha), and the posture angle of the magnetic head slider 2 in a pith direction with respect to the magnetic disk 101 is held at an angle shown by an angle θb which is steeper than the angle θa shown in FIG. 2A (θb>θa). Thereby, the tip part of the magnetic head slider 2, having the magnetic head element, is held in a state of being closer to the magnetic disk 101.

Next, explanation will be given for a case shown in FIG. 2C. FIG. 2C shows a case where the length H of the actuator 3 (length in an extending/contracting direction) is a length Ha which is almost same as the thickness h of the magnetic head slider 2 (main recess plane) (height Hc<h), and the actuator 3 is not extended or contracted, or a case where the actuator 3 is extended or contracted so as to be set to have the length Hc. In such a state, when the disk 101 rotates, air of the amount shown by the reference sign Ac is flown in between the magnetic disk 101 and the magnetic head slider 2. The amount of the flown air increases comparing with the case shown in FIG. 2A (Ac>Aa). Accordingly, a dynamic pressure to fly the magnetic head slider 2 upward is generated, and the flying force Fc energized to the magnetic head slider increases comparing with the case shown in FIG. 2A (Fc>Fa). Further, since the amount of the flown air Ac is large, the pressing force to press the tip side of the magnetic head slider 2 obliquely upward increases, comparing with the case shown in FIG. 2A. Thereby, the rotational force shown by the reference sign Mc about the dimple 51 increases in the magnetic head slider 2. As a result, in the case shown in FIG. 2C, the tip part of the magnetic head slider 2 is held in a state of flying at a height shown by the reference sign hc which is higher than the case shown in FIG. 2A (hc>ha), and the posture angle in a pitch direction of the magnetic head slider 2 with respect to the magnetic disk 101 is held at an angle shown by the reference sign θc which is gentler than the angle θa shown in FIG. 2A (θc<θa). Thereby, the tip part of the magnetic head slider 2, having the magnetic head element, is held in a state of keeping more distance from the magnetic disk 101.

The description given above will be summarized as follows. When the actuator 3 is controlled to extend as shown in FIG. 2B (Hb>h), the flying height hb of the magnetic head slider decreases, and the angle θb with respect to the disk 101 becomes steeper, so the tip part of the magnetic head slider 2, having the magnetic head element, is held in a state of being closer to the disk 101. Therefore, when performing reading/writing of data to the disk 101 or if the accuracy of reading/writing is desired to be improved, the actuator 3 should be controlled to extend on the basis of FIG. 2A. This also applies to the case where the state of the actuator 3 is moved from that shown in FIG. 2C to that shown in FIG. 2A.

Further, when the actuator 3 is controlled to have the same height as the main recess plane as in the case of FIG. 2C (Hc=h), the flying height hc of the magnetic head slider 2 increases, and the angle θc with respect to the disk 101 becomes gentler. Accordingly, the tip part of the magnetic head slider 2 to which the magnetic head element is provided is kept in a state of spacing apart from the disk 101. Therefore, the actuator 3 should be controlled to contract to have the same height as the main recess plane in order to suppress the magnetic head slider 2 to be clashed on the disk 101 in a state where reading or writing of data is not performed, or to promote quick flying at the time of activation. This also applies to the case where the state of the actuator 3 being extended as shown in FIG. 2B is moved to the state shown in FIG. 2A.

Note that although, in the description given above, the extendable/contractible actuator 3 is exemplary shown as a device for regulating the air flow amount flown in between the magnetic disk 101 and the magnetic head slider 2, it is not limited to such a configuration. Any device which operates so as to regulate the air flow amount (air flow regulating device) may be used.

Further, although the reference height of the actuator 3 has been described as Hc shown in FIG. 2C in the description given above, the height Hc is not limited to a state where the actuator 3 is not controlled to extend or contract without being applied with a voltage. For example, a configuration in which the normal height is Ha as shown in FIG. 2A and the actuator 3 is controlled to extend or contract so as to have the height of Hb or Hc may be acceptable.

Here, the form of the floating face of the magnetic head slider 2 will be shown specifically, and the relationships with extended/contracted states of the actuator 3 will be described with reference to FIGS. 3A to 4C. FIG. 3A shows a form of the floating face of the magnetic head slider 2. FIG. 3B shows a sectional view taken along the line A'-A' of FIG. 3A. As shown in FIG. 3A, the floating face of the magnetic head slider 2 includes: a main recess plane 22 in which the thickness (height) from the mounting face of the magnetic head slider 2 is the thinnest (lowest); a shallow recess plane 23 which is formed higher by one step; and an ABS plane 24 which is formed much higher. Although the form of the floating face will be explained in detail in another embodiment, this embodiment shows a case where the depth from the ABS plane 24 to the main recess plane 22 is 2.0 μm, and the depth from the ABS plane 24 to the shallow recess plane 23 is 0.2 μm. FIG. 3B shows a state where the height of the actuator 3 is same as the height of the main recess plane of the magnetic head slider 2. Further, FIGS. 4A to 4C show simulation results relating to flying heights and pitches of the magnetic head slider 2 when the height of the actuator 3 is changed. In particular, the Figures show flying heights at positions of inner periphery (radius 17 mm), intermediate periphery (radius 24 mm) and outer periphery (radius 30 mm) of the magnetic disk.

When the height of the actuator 3 is lower than the main recess plane (see FIG. 4A), the flying height and the pitch at the time of general reading and writing do not change. In FIG. 4B where the height of the actuator 3 is same as the shallow recess plane, the flying height rises from that of the general case, and increases to about 18 times at the intermediate periphery, for example. Further, in FIG. 4C where the height of the actuator 3 is same as that of the main recess plane, the flying height further rises and increases to about 53 times at the intermediate periphery, comparing with the general case. Further, the pitch also increases to 6 times at the intermediate periphery.

Considering the above, at the time of performing reading/writing to the magnetic disk, the height of the actuator 3 should be controlled to be lower than the main recess plane. On the other hand, when the magnetic head slider is made to be in an evacuated state (highly flying state) from the magnetic disk, the height of the actuator 3 should be controlled to be same as that of the main recess plane or the shallow recess plane. However, when data reading/writing with respect to the magnetic disk is possible in the high flying state, it is possible to regulate the flying height of the magnetic head slider 2, while keeping the high flying state, by controlling the actuator 3 to extend or contract so as to be in the same height as that of the main recess plane or the shallow recess plane. Thereby, reading/writing can be performed with high accuracy while suppressing a clash of the magnetic head slider 2.

(Modification)

In the description given above, it has been explained that the air flow amount flown in between the magnetic head slider 2 and the magnetic disk 101 varies depending on the change in the height in an extending/contracting direction of the actuator 3, whereby the flying force of the magnetic head slider 2 also changes, which changes the degree of the elastic modification of the load beam 5 (flying force Fb<Fa<Fc). However, a configuration, in which the rigidity of the load beam 5 is improved so that the amount of elastic modification does not change due to the change in the air amount corresponding to the extension/contraction of the actuator 3, may be adopted. Such states are shown in FIGS. 5A to 5C. In these Figures, the arrow Ar shows a flowing direction of the air flown in between the magnetic head slider 2 and the magnetic disk 101 due to the rotation of the magnetic disk 101.

In FIGS. 5A, 5B and 5C, the load beam 5 is elastically deformed due to a certain amount of the flown air, whereby the magnetic head slider 2 flies by a certain amount with respect to the disk 101. However, although the amount of the flown air changes due to the extension or contraction of the actuator 3, a change in the flying height exceeding the level will not be caused due to the rigidity of the load beam 5. That is, the height of the load beam 5 with respect to the disk 101 is constant (h'a=h'b=h'c).

To the magnetic head slider 2, only the rotational force about the dimple of the load beam is acted (Ma, Mb, Mc in FIGS. 5A, 5B, 5C), so the posture angle in a pitch direction of the magnetic head slider 2 changes in the similar manner as that described above. In other words, since the pressing force to press the tip side of the magnetic head slider 2 varies due to the change in the amount of the flown air, the posture angle in a pitch direction of the magnetic head slider 2 changes (in FIGS. 5A, 5B and 5C, $\theta c<\theta a<\theta b$) as described above. Thereby, it is also possible to control the distance from the magnetic head element, formed at the tip part of the magnetic head slider 2, to the disk 101.

Embodiment 2

Figure 6:
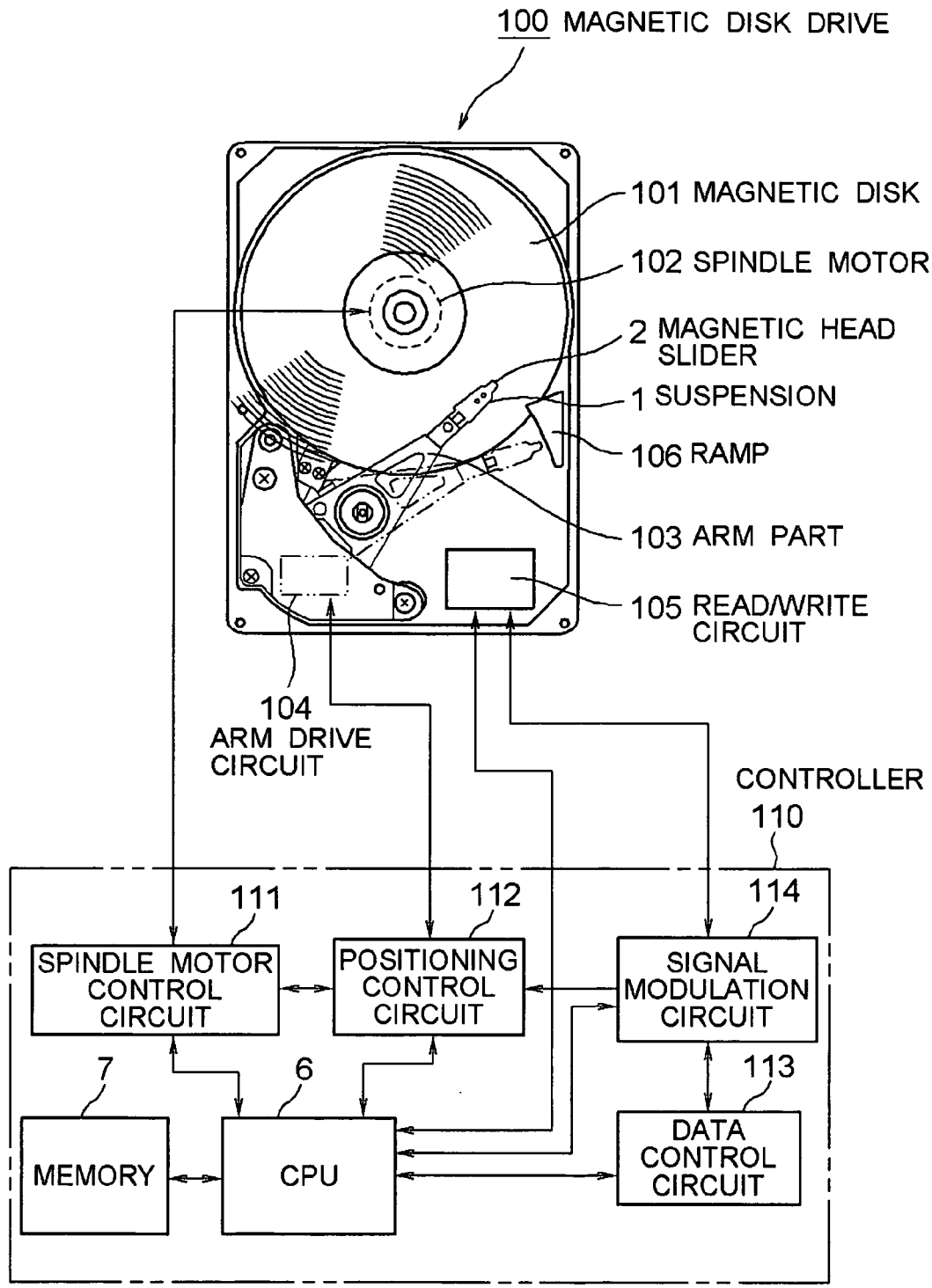
FIG. 6 shows the overall configuration of a magnetic disk drive which is the present invention.

Next, a second embodiment of the present invention will be explained with reference to FIGS. 6 to 8. FIG. 6 is a diagram showing the configuration of a magnetic disk device. FIGS. 7A, 7B and 7C show the configuration of the magnetic head slider and the operating state of the actuator. FIG. 8 is a flowchart showing the operation of the magnetic disk drive in the present embodiment.

(Configuration)

First, the overall configuration of a magnetic disk drive 100, in which the suspension 1 is mounted, in the present embodiment will be explained. In particular, in the present embodiment, there is described a case where a face of the magnetic head slider 2 facing the magnetic disk 101, that is, the floating surface (flying surface) with respect to the disk 101, is in a specific form as described later.

The magnetic disk drive 100 in the present invention has a configuration almost similar to that of a typical magnetic disk drive. In a detailed explanation given with reference to the schematic diagram of the magnetic disk drive shown in FIG. 6, the magnetic disk drive 100 mainly includes the magnetic disk 101, a spindle motor 102 for rotatably driving the magnetic disk 101, a magnetic head slider 2 for performing reading/writing of data to the magnetic disk 101, and the suspension 1 which is a magnetic head assembly for holding the magnetic head slider 2 at the tip part, and an arm part 103 for supporting and driving the suspension 1.

Further, the magnetic disk drive 100 includes an arm driving circuit 104 for driving the arm part 103 so as to cause the magnetic head slider 2 positioned at the tip thereof to rotate reciprocally along the disk surface, and a read/write circuit 105 for performing reading/writing of data to the magnetic disk 101 via the magnetic head slider 2, and a controller 110 (controlling part) for controlling the overall operation of the magnetic disk drive 100.

Further, the magnetic disk drive 100 of the present embodiment includes a ramp 106 formed of an oblique member outside (or on the upper part of the outermost periphery) the magnetic disk 101. When the rotation of the magnetic disk 101 is stopped or it is in the slow rotational state, the tip part of the suspension 1 gets on the ramp 106 so as to be in a state where the magnetic head slider 2 is evacuated not to contact the disk surface. In other words, the magnetic disk drive 100 adopts a loading/unloading system.

Of course, the magnetic disk drive 100 includes configurations not shown in FIG. 4. However, explanation for configurations provided in a typical magnetic disk drive is omitted. Hereinafter, particularly characteristic configurations in the present embodiment will be explained in detail.

(Magnetic Head Slider and Actuator)

The configuration of the magnetic head slider 2 will be explained with reference to FIGS. 7A to 7C. FIG. 7A shows the form of the floating surface of the magnetic head slider 2 in the present embodiment, FIG. 7B is a sectional view taken along the line B-B in FIG. 7A, and FIG. 7C shows a state where the actuator 3 is extended/contracted.

Figure 7A:
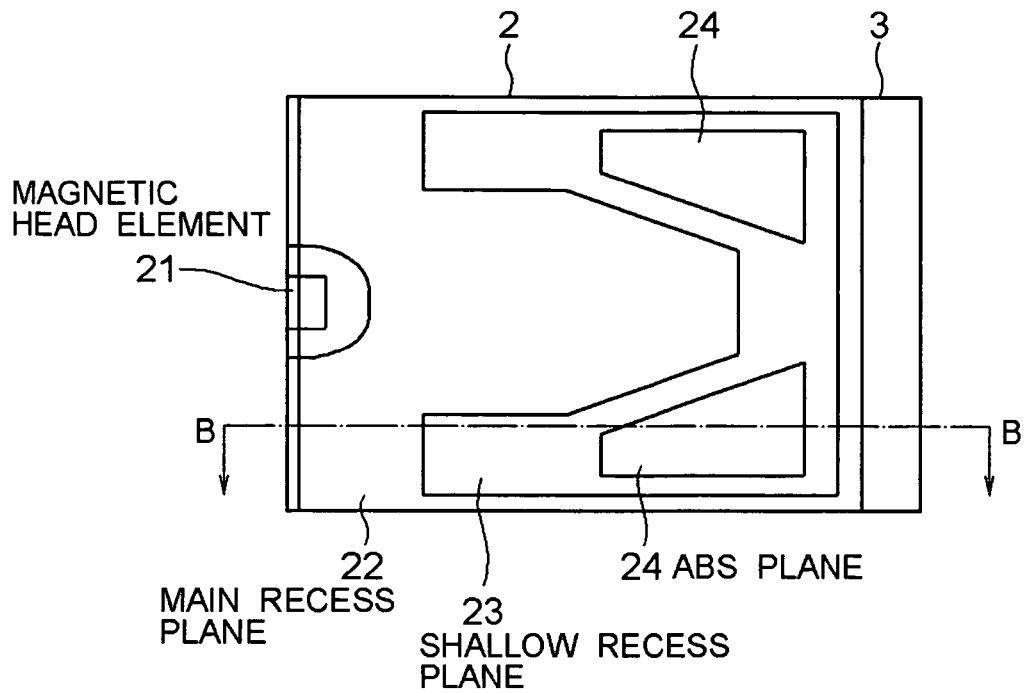
Figure 8:
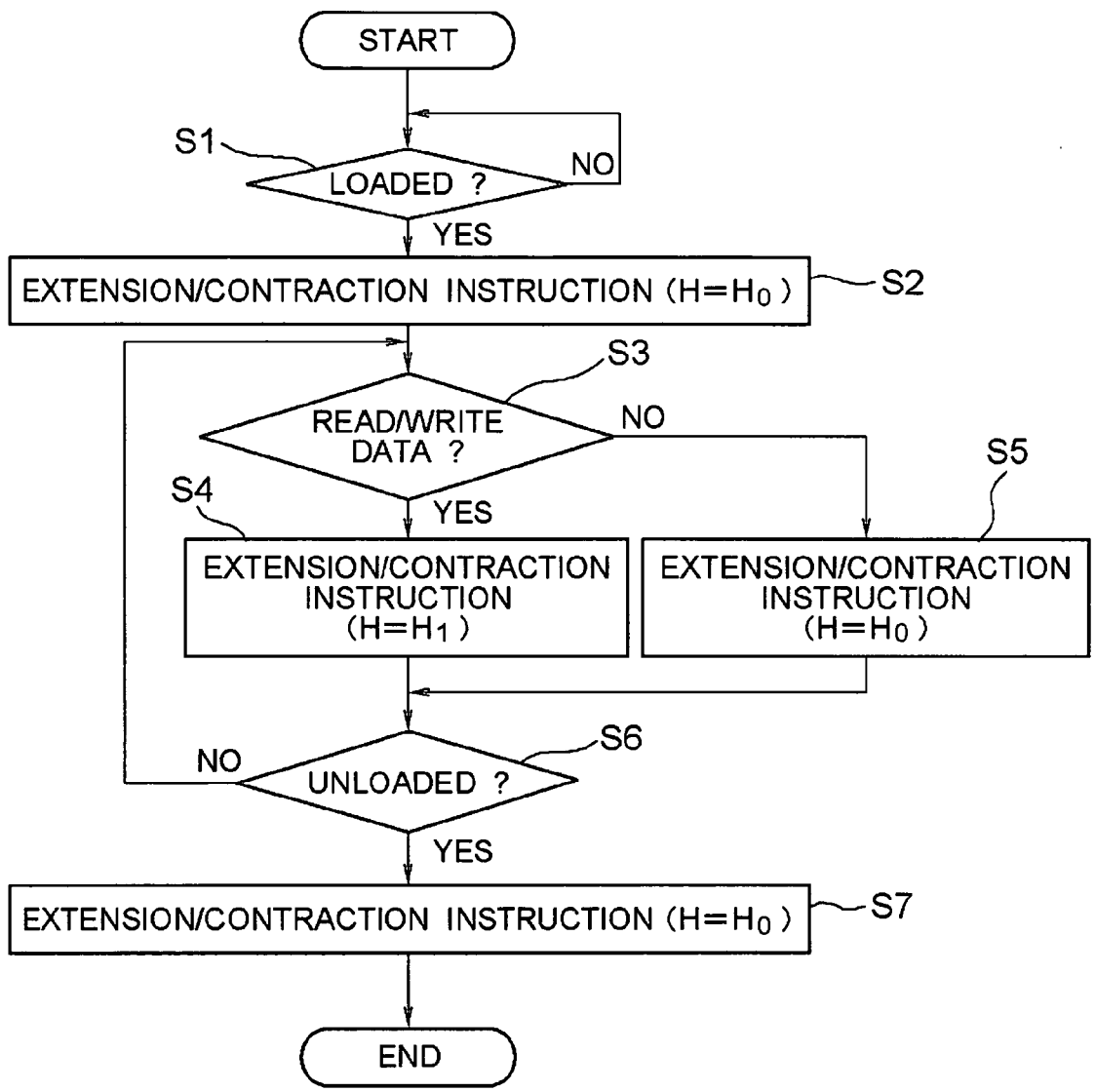
FIG. 8 is a flowchart showing operation of the magnetic disk drive in the embodiment 2.

In FIG. 7A, the left end part of the magnetic head slider 2 becomes the tip side when mounted on the suspension 1. The tip side is provided with a magnetic head element 21 performing reading/writing of data to the magnetic disk surface. Further, the rear end side is provided with the actuator 3, adjacent thereto, as an air flow amount regulating device.

As shown in FIG. 7A, the floating surface of the magnetic head slider 2 has recesses and raised parts. In the most part of the tip side and the center part, the thickness of the magnetic head slider 2 itself is formed to be thinnest, whereby a main recess plane 22 is formed (height of the main recess plane 22: $h_0$). Further, a raised part in an almost U-shape is formed so as to open from the rear end side to the tip side, whereby a shallow recess plane 23 is formed (height of the shallow recess plane 23: $h_1$). On the rear end side, almost trapezoid ABS planes 24 are formed as two divided planes, which are raised from the shallow recess plane 23 (height of ABS plane 24: $h_2$). Note that this form of the floating surface is adopted in a typical magnetic head slider, so the detailed explanation is omitted.

In the present embodiment, the actuator 3 is set to be controlled to extend or contract on the basis of the height $h_0$ of the main recess plane 22 such that the magnetic head slider 2 keeps desired flying heights at the time of performing reading/writing of data and at the time of standby in the air. The height of extension/contraction has been set beforehand from the result of simulation. In the case of a floating surface of such a form, it is set as follows.

When the magnetic head slider 2 is on standby in the air while not performing reading/writing of data to the magnetic disk 101, that is, when the maximum flying height is desired, the height H of the actuator 3 is made equal to the height $h_0$ of the main recess plane 22 (H=$h_0$). The height H of the actuator 3 at this time is shown as $H_0$. Further, when the magnetic head slider 2 performs reading/writing of data, that is, when the magnetic head slider 3 is lowered to be close to the magnetic disk 101 surface so as to be able to read or write data, the height H of the actuator 3 is made shorter than the height $h_0$ of the main recess plane 22 (H<$h_0$) The height H of the actuator at this time is shown as $H_1$. Thereby, when on standby, the magnetic head slider 2 is not made close to the magnetic disk 101 surface unnecessarily, so clash can be suppressed effectively, and when performing reading/writing of data, the magnetic head slider 2 can be made to be close to the magnetic disk surface, which enables accurate reading or writing.

Next, the configuration of the controller 110 for controlling the operation of the magnetic disk drive 100 will be explained with reference to FIG. 6.

The controller 110 includes a CPU 6 for controlling the operation of each component of the whole drive, and a memory 7 such as an EEPROM on which data used for controlling by the CPU 6 is stored. Further, the controller 110 also includes: a spindle motor control circuit 111 for controlling the rotational state of a spindle motor 102 which rotationally drives the disk 101, according to an instruction from the CPU 6; a positioning control circuit 112 for controlling an arm drive circuit 104 which performs positioning of the magnetic head slider 2; a data control circuit 113 for controlling information which is written onto or read from the disk 101; and a signal modulation circuit 114 for modulating data which is written onto or read from the disk 101 so as to enable the data to be exchanged with the disk 101. As for each component provided in a typical magnetic disk drive, the detailed explanation is omitted. Hereinafter, the configuration of the CPU 6 will be mainly explained in detail.

In the CPU 6, a program for controlling the posture of the magnetic head slider 2, stored and prepared in the memory 7 or the like beforehand, is installed. Thereby, there are constructed a slider operation obtaining processor for detecting the driving state of the magnetic disk drive 100, in particular, the operation of the magnetic head slider 2 on the magnetic disk 101, and an extension/contraction controlling processor (extension/contraction controlling device) for controlling the extending/contracting operation of the actuator 3. Of course, in the CPU 6, other processors for performing reading/writing of data to the magnetic disk 101 are constructed, and functions for controlling the respective circuits are provided. However, as for functions provided in a typical magnetic disk drive, the detailed explanation is omitted. Hereinafter, each processor mentioned above will be explained in detail.

The slider operation obtaining processor detects the driving state of the magnetic disk drive 100, and in particular, has a flying operation detecting function with which a load operation that the magnetic head slider 2 starts flying is detected. The flying operation detecting function also has a function of detecting an unload operation to retract the magnetic head slider 2 to the ramp 106. Further, the slider operation obtaining processor also has a reading/writing operation detecting function with which the driving state of the magnetic disk drive 100, that is, whether processing of reading/writing of data to the magnetic disk 101 is performed or not, is detected. In other words, the slider operation obtaining processor can detect whether the magnetic head slider 2 does not perform reading/writing and is on standby while flying high above the magnetic disk. Note that the processing performed by each of the detecting functions is executed by obtaining information that loading operation or unloading operation of the magnetic head slider 2 starts, or by obtaining information indicating a reading/writing instruction, from a positioning controlling processor, not shown, constructed in the CPU 6. When the above-mentioned operation is detected, it is notified to an extension/contraction controlling processor.

The extension/contraction controlling processor performs controlling of extension/contraction of the actuator 3 corresponding to a notification from the slider operation obtaining processor. Here, operations of controlling extension/contraction have been set beforehand corresponding to contents notified from the slider operation obtaining processor, and such operational instructions are incorporated in the extension/contraction controlling processor. A content of extending/contracting operation is so set that when the flying operation detecting function detects that flying of the magnetic head slider 2 starts, that is, when a loading operation of the magnetic head slider 2 starts, for example, the height H in an extending/contracting direction of the actuator 3 is controlled to be $H=H_0$, that is, controlled to be the same height as that of the main recess plane 22 ($H=h_0$). Similarly, at the time of unloading operation of the magnetic head slider 2, it is set to control the height to be $H=H_0$. Further, when the reading/writing operation detecting function detects that reading/writing of information is performed to the magnetic disk 101, it is set to control the height H of the actuator 3 in an extending/contracting direction to be $H=H_1$, that is, to be shorter than the height $h_0$ of the main recess plane 22 ($H<h_0$) On the other hand, when it is detected that the magnetic head slider 2 does not perform reading/writing of information and is in a standby state, it is set that the height H of the actuator 3 in an extending/contracting direction is controlled to be $H=H_0$, that is, to be the same height as that of the main recess plane 22 ($H=h_0$).

The set heights described above, that is, voltage values applied to the actuator 3 for controlling to have the respective heights of the actuator 3, may be installed in the extension/contraction controlling processor beforehand or stored on the memory 7. The values of the heights H of the actuator 3 set corresponding to the respective operations described above may be stored on the memory 7.

The extension/contraction controlling processor applies a voltage to the actuator based on the applying voltage value corresponding to the height H of the actuator 3, set based on the content notified from the slider operation obtaining processor, to thereby control the extension/contraction.

(Operation)

Next, operation of the magnetic disk drive 100, in particular, posture controlling operation of the magnetic head slider 2 will be explained with reference to a flowchart in FIG. 8.

First, the slider operation obtaining processor detects that the magnetic head slider 2 is loaded on the disk 101 (positive determination in step S1). Then, the slider operation obtaining processor notifies the fact to the extension/contraction controlling processor which instructs an extension/contraction control of the actuator 3 (step S2). Here, an instruction to apply a voltage value for extending or contracting the height H of the actuator 3 so as to be the same height $H_0$ as that of the height $h_0$ of the main recess plane 22, or an instruction to stop an applied voltage so as to keep the current height of the actuator 3, may be placed. Then, when $H=H_0=h_0$ as shown in FIG. 7B, the flying height of the magnetic head slider 2 increases, so the distance from the magnetic disk surface becomes longer. Thereby, it is possible to suppress occurrence of a clash when activated, so that the magnetic head slider 2 can be loaded on the disk 101 stably. Further, it is also possible to speed-up flying of the magnetic head slider 2, that is, to realize high-speed activation of the magnetic disk drive.

Then, at a constant cycle (e.g., 0.1 second interval), it is detected whether reading/writing processing of data to the disk 101 is performed in the magnetic head slider 2. For example, it is detected that whether a reading/writing instruction of data is outputted from a circuit serving as a reading/writing operation detecting device such as a read/write circuit 105 (step S3).

If it is detected that reading/writing of data to the magnetic disk 101 is performed, the fact that it is the time of reading/writing of data is notified to the extension/contraction controlling processor, and if it is not detected, the fact that it is the standby time is notified to the extension/contraction controlling processor.

The extension/contraction controlling processor outputs an instruction to apply a voltage for extending or contracting the actuator 3 to be the height set beforehand corresponding to the notified content, via the positioning control circuit 112 or the like. That is, when a notification that it is the time for reading or writing is given (positive determination in step S3), the actuator 3 is controlled to extend or contract such that the height H thereof becomes $H=H_1$ (step S4), and when a notification that it is the standby time is given (negative determination in step S3), the actuator 3 is controlled to extend or contract such that the height H thereof becomes $H=H_0$ (step S5). If the control target height of the actuator 3 is same as the current height H, the height is kept as it is. Thereby, the actuator 3 extends or contracts actually, so that the flying height and the posture angle of the magnetic head slider 2 can be controlled accurately corresponding to each operation. In particular, since the flying height is large at the time of standby, occurrence of a clash can be suppressed effectively, whereby reliability of the magnetic disk drive can be improved. In contrast, since the magnetic head slider 2 is in a low flying state at the time of reading/writing, the accuracy of reading/writing can be improved.

Then, a flying height control of the magnetic head slider 2, corresponding to the time of reading/writing or the time of standby, is performed repeatedly until the slider operation obtaining processor detects unloading operation (negative determination is step S6). When the slider operation obtaining processor detects unloading operation (positive determination is step S6), it notifies the fact to the extension/contraction controlling processor. Then, the extension/contraction controlling processor outputs an extension/contraction controlling instruction such that the height H of the actuator 3 becomes $H=H_0$ (step S7). Accordingly, similar to the operation at the time of loading described above, the flying height of the magnetic head slider 2 can be controlled significantly, whereby it is possible to perform unloading easily by flying the magnetic head slider 2 securely.

Here, the flying height of the magnetic head slider 2 based on the relationship between the height H of the actuator 3 and the height h of the magnetic head slider 2 in the present embodiment is based on the simulated result, which includes a part different from the content described in the embodiment 1. This is due to the fact that the floating surface of the magnetic head slider 2 exemplary shown in the present embodiment has a complex form. As described above, a method of controlling extension/contraction of the actuator 3 for obtaining a desired flying height is different depending on the form of the floating surface. However, in any case, it is possible to control the flying height of the magnetic head slider 2 by regulating the air amount flown in between the magnetic disk 101 and the magnetic head slider 2, so the technical significance of the present invention is obvious.

(Modification)

Although the magnetic disk drive 100 described above adopts a loading/unloading system, it may be one adopting a CSS system in which the magnetic head slider 2 contacts the disk surface when the rotation of the disk is stopped. In such a case, the slider operation obtaining processor has a function of detecting a rotation start of the disk so as to detect flying start of the magnetic head slider 2, and notifying the extension/contraction processor of it. Operation of a magnetic disk drive of such a configuration will be explained below.

First, the slider operation obtaining processor detects an activation of the disk drive such as a start of rotation of the magnetic disk 101. Then, the slider operation obtaining processor notifies the extension/contraction controlling processor of it, and the extension/contraction controlling processor outputs an extension/contraction controlling instruction to make the height H of the actuator 3 to be $H=H_0$. Thereby, the height of the actuator 3 becomes the same as the height $h_0$ of the main recess plane 22, and the flying height of the magnetic head slider 2 can be controlled to be increased. This enables to fly the magnetic head slider 2 rapidly, and to reduce the activation time. Further, a time period that the magnetic head slider 2 contacts the rotating magnetic disk 101 can be reduced, whereby damages on the magnetic head slider 2 and the magnetic disk 101 can be suppressed. After that, it operates similarly to the magnetic disk drive of a loading/unloading system as described above.

Embodiment 3

Figure 9A:
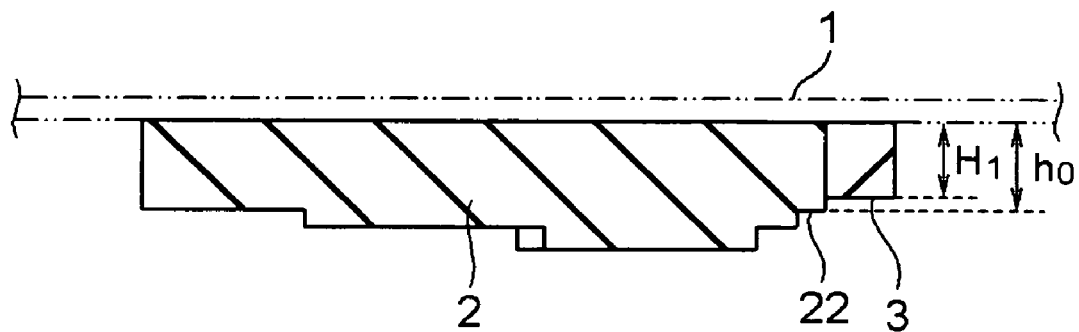
FIGS. 9A, 9B and 9C are sectional views taken along the line B-B of the magnetic head slider disclosed in FIG. 7A, showing states where the actuator in the embodiment 3 is extended/contracted, respectively.
Figure 9B:
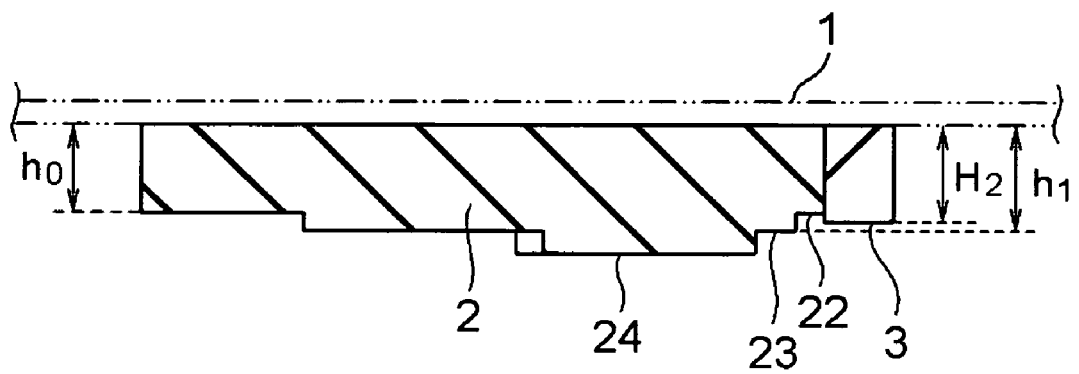
Figure 9C:
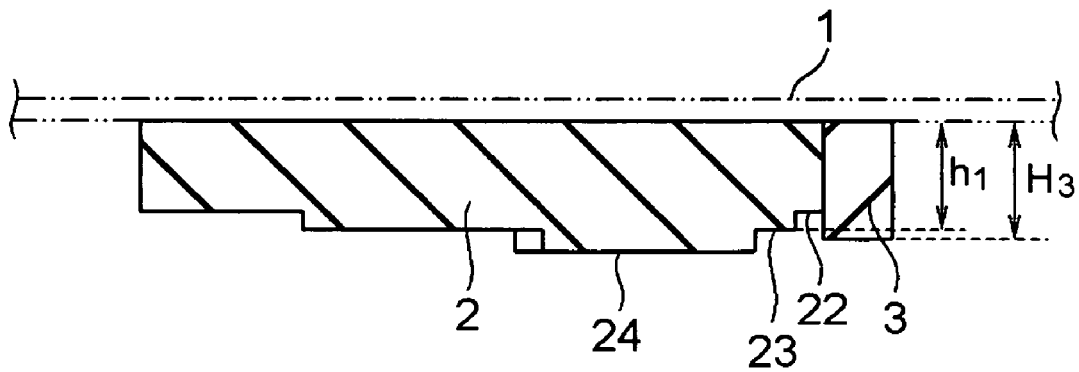
Figure 10:
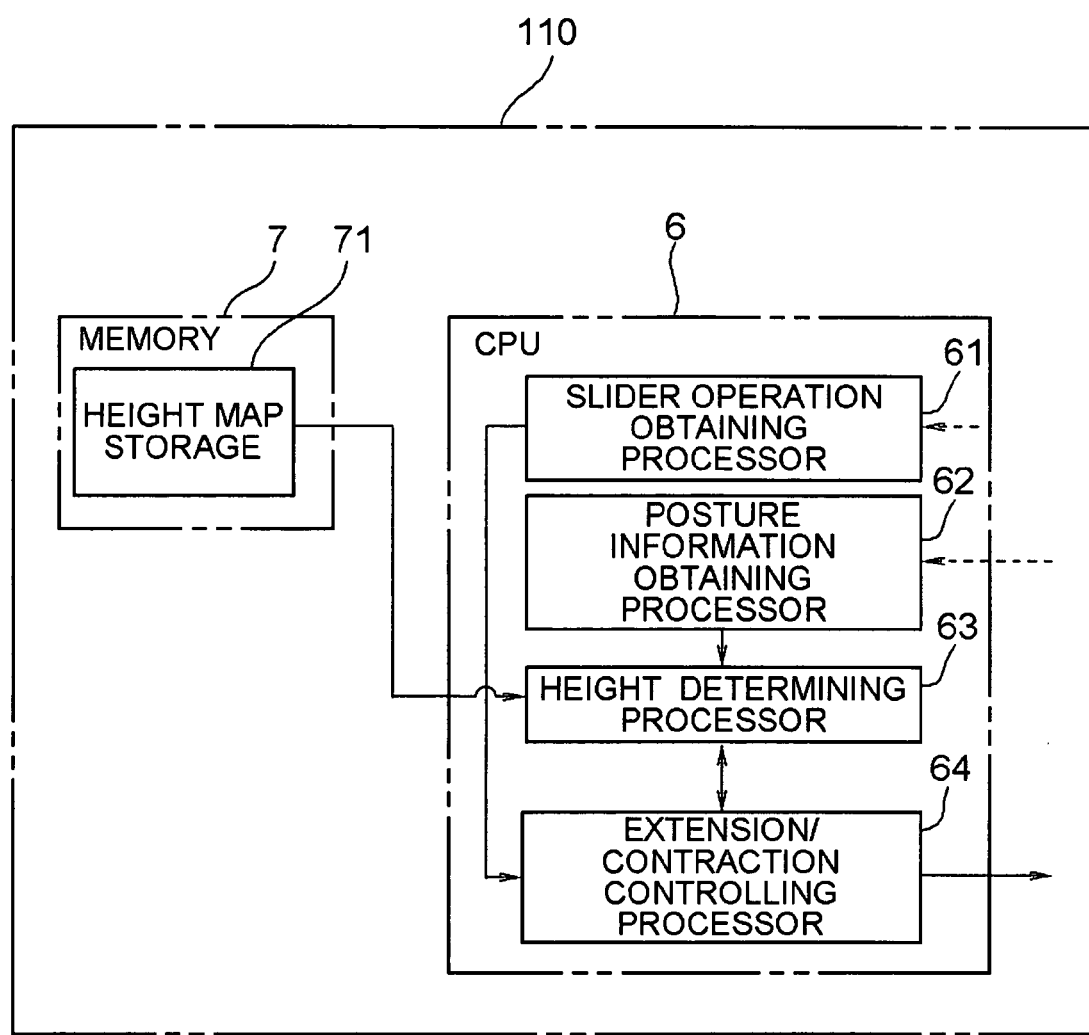
FIG. 10 is a functional block diagram showing the configurations of a CPU and a memory in the embodiment 3.
Figure 11A:
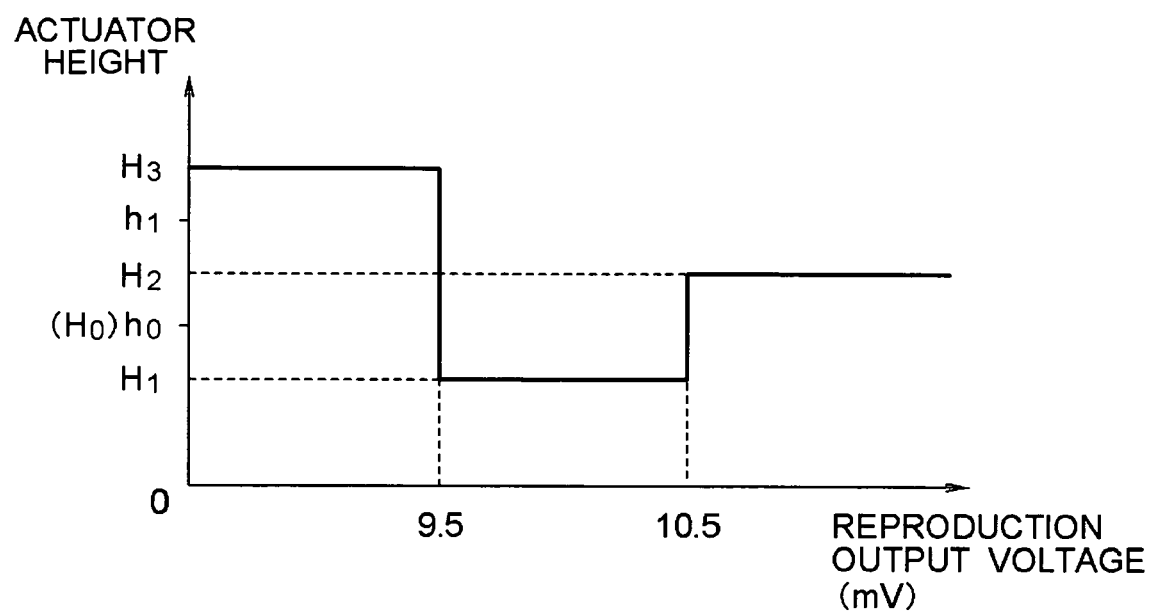
Figure 12:
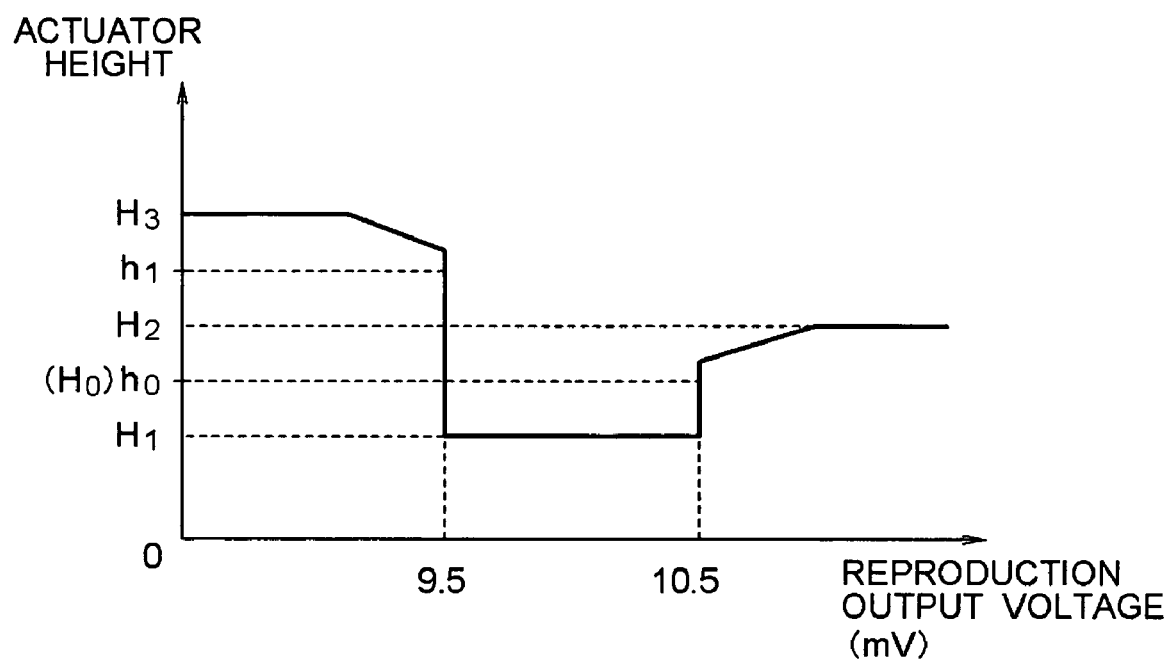
FIG. 12 is a graph showing another example of the height map data.
Figure 13:
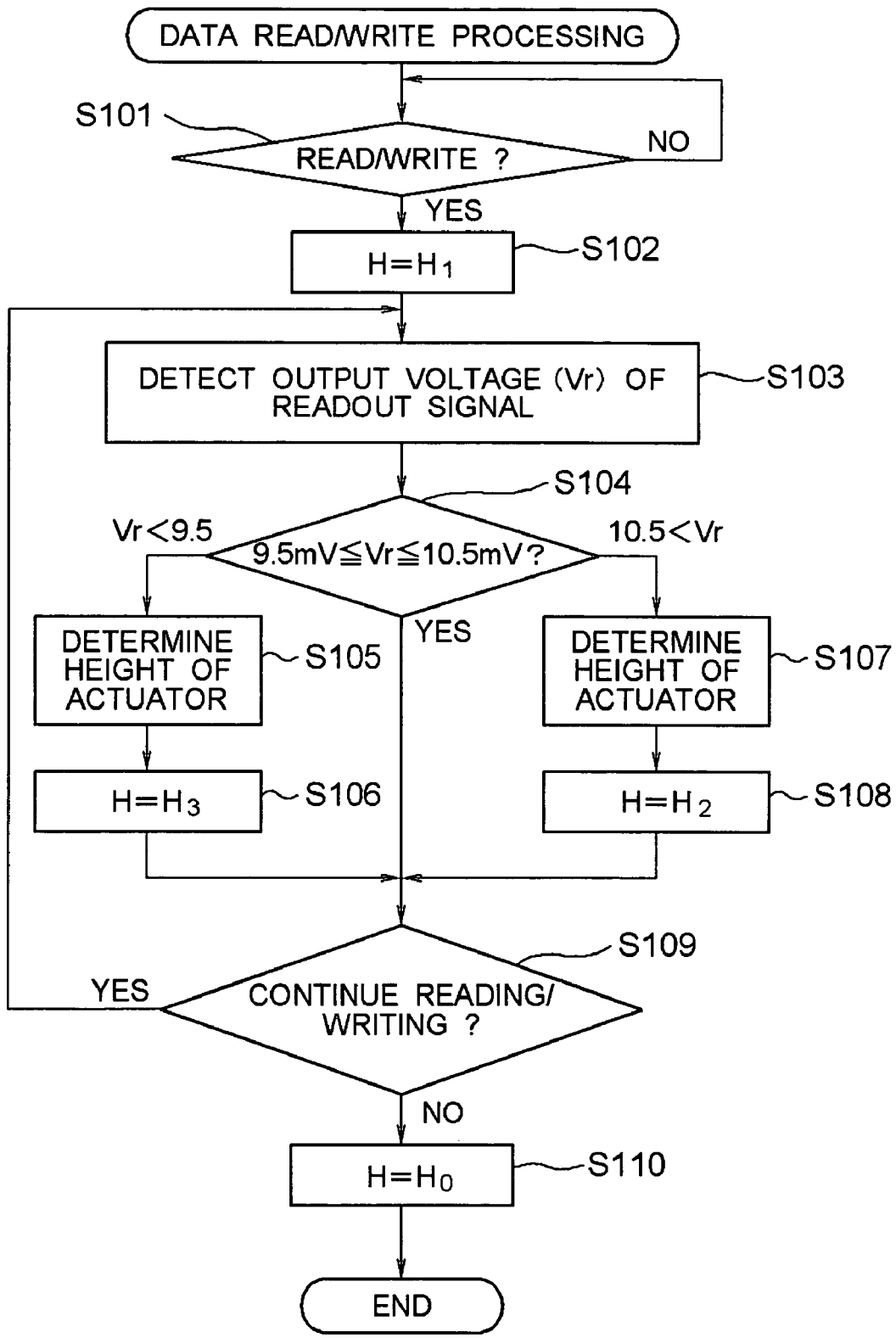
FIG. 13 is flowchart showing operation of the magnetic disk drive in the embodiment 3.

A third embodiment of the present invention will be explained with reference to FIGS. 9A to 13. FIGS. 9A, 9B and 9C illustrate states of the actuator controlled to extend and contract in the present embodiment. FIG. 10 is a functional block diagram showing the configuration of the CPU, and FIGS. 11A to 12 illustrate contents of data stored on the memory. FIG. 13 is a flowchart showing the operation of the magnetic disk drive.

(Configuration)

The magnetic disk drive 100 in the present embodiment is almost similar to that of the embodiment 2. The present embodiment is characterized in that the actuator 3 adjusts the posture of the magnetic head slider 2 with respect to the magnetic disk 101 at the time of reading/writing of data. More specifically, the actuator 3 is extended or contracted corresponding to the flying height so as to adjust the flying height of the magnetic head slider. Hereinafter, explanation will be given for, first, flying characteristics of the magnetic head slider 2 corresponding to the height of the actuator 3, and a controlling method of the actuator 3.

<Magnetic Head Slider and Actuator>

Figure 7B:
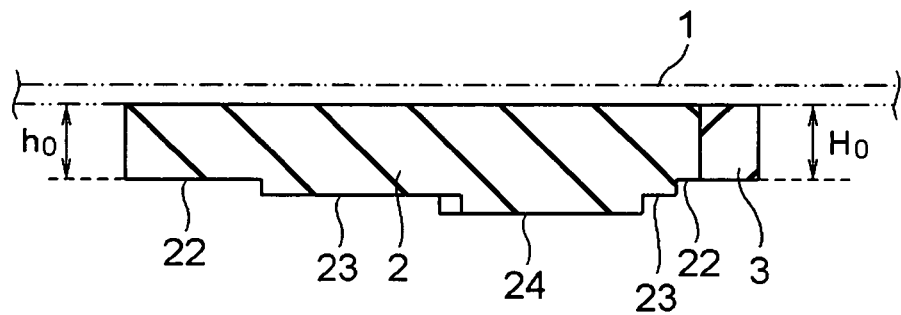
Figure 7C:
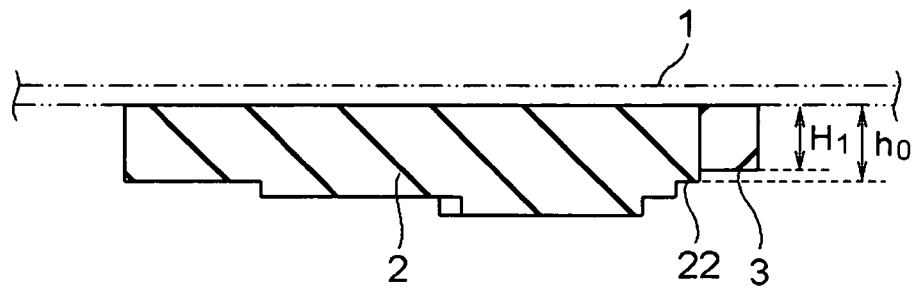

The magnetic head slider 2 in the present embodiment has a floating surface (flying surface) form similar to that explained in the embodiment 2 with reference to FIGS. 7A to 7C. Here, based on FIG. 7C, states where the actuator 3 is extended and contracted are shown in FIGS. 9A, 9B and 9C.

In the present embodiment, at the time of reading/writing data, the height H of the actuator 3 is made shorter than the height $h_0$ of the main recess plane 22 ($H=H_1<h_0$) as shown in FIG. 9A (same as FIG. 7C) from the standby state in the air, and the flying state of the magnetic head slider 2, in a state where it is lowered so as to be readable/writable, is finely regulated further. Note that the relationship between the flying height of the magnetic head slider 2 and the extended/contracted height of the actuator 3 is calculated through simulation, and by considering the result, the height of the actuator 3 may be controlled to be set such that the magnetic head slider 2 has a desired flying height as described below.

First, when the height is set to $H=H_1$ as shown in FIG. 9A, the magnetic head slider 2 flies at a position where it can perform reading or writing of data to the magnetic disk. Such a flying position is called "standard flying position" here. When the height H of the actuator 3 is set to $H_2$ which is higher than the height $h_0$ of the main recess plane 22 and is lower than the height $h_1$ of the shallow recess plane 23 ($h_0<H_2<h_1$) as shown in FIG. 9B, the magnetic head slider 2 flies higher than the standard flying position. Accordingly, as a result of detecting the flying height of the magnetic head slider 2, if it is too low which may cause a clash as described later, it is possible to fly the magnetic head slider 2 to a position higher than the standard flying position by controlling the height of the actuator 3 to extend or contract so as to be H=$H_2$. Further, when the height H of the actuator 3 is set to a height $H_3$ which is higher than the height $h_1$ of the shallow recess plane 23 ($h_1$<$H_3$) as shown in FIG. 9C, the flying height of the magnetic head slider 2 can be reduced. Accordingly, if the flying height of the magnetic head slider 2 is determined as too high, it is possible to lower the magnetic head slider 2 with respect to the magnetic disk 101 than the standard flying position by controlling the height of the actuator to extent or contract so as to be H=$H_3$, whereby reading/writing of data can be performed securely.

<Controller (Controlling Unit)>

Next, the configuration of the controller 110 will be explained with reference to FIG. 10. The basic configuration of the controller 110 is similar to that of the embodiment 1, but functions of the CPU 6 controlling the operation are different. FIG. 10 is a functional block diagram showing the configurations of the CPU 6 and the memory 7. As shown in FIG. 10, a posture control program for the magnetic head slider, stored and prepared in the memory 7 or the like beforehand, is installed in the CPU 6, whereby respective processors 61 to 64 shown in FIG. 10 are constructed. That is, in the CPU 6, there are constructed a slider operation obtaining processor 61 for detecting the operation of the magnetic head slider 2 on the magnetic disk 101, a posture information obtaining processor 62 for obtaining posture information indicating the posture of the magnetic head slider 2 with respect to the magnetic disk 101, a height determining processor 63 for determining the height of the actuator 3 based on the posture information, and an extension/contraction controlling processor 64 for controlling the extending/contracting operation of the actuator 3. Since the slider operation obtaining processor 61 and the extension/contraction controlling processor 64 have almost same functions as those described in the embodiment 1, hereinafter, the posture information obtaining processor 62 and the height determining processor 63 will be described in detail, particularly.

The posture information obtaining processor 62 obtains an output voltage value of a readout signal read out from the magnetic disk 101 in the magnetic head slider 2 as posture information of the magnetic head slider 2. At this time, the output voltage value of the readout signal is obtained from the read/write circuit 105, or via a signal modulation circuit 114 or a data control circuit 113. Accordingly, these circuits 105, 114 and 113 serve as posture information detecting device for detecting posture information indicating the posture of the magnetic head slider 2 and notifying the posture information obtaining processor 62 of the posture information. A particular method for identifying the posture of the magnetic head slider 2 from the output voltage value of the readout signal detected will be explained in an embodiment described later.

Note that the posture information detecting device may be realized by additionally providing a detecting device such as a new circuit. Further, the output voltage value of a readout signal is an example of posture information, and another information may be detected by another posture information detecting device as posture information.

The height determining processor 63 determines a control target height of the actuator 3 based on height map data indicating the height of the actuator set beforehand corresponding to posture information, and the posture information obtained. The height map data is stored on a map storage 71 within the memory 7. An example of the height map data will be explained with reference to FIGS. 11A to 12.

The height map data shown in FIG. 11A shows output voltage values of a readout signal in the horizontal axis, and shows the height of the actuator 3 in the longitudinal axis. Further, applying voltage data applied to the actuator 3 corresponding to the height is stored on the memory, additionally (not shown). In this map, it is assumed that when the output voltage Vr of a readout signal is in a range of 9.5 mV$\leq$Vr$\leq$10.5 mV, for example, the magnetic head slider is positioned with a flying height which can realize appropriate reading/writing of data. If the voltage is outside the range, it is set to change the height H of the actuator 3.

Figure 11B:
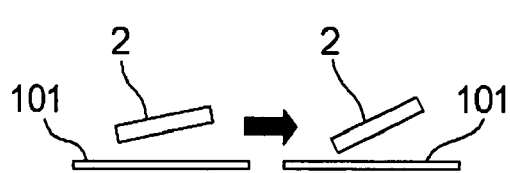

More specifically, in the case of Vr<9.5 mV, the output voltage is small, so it is assumed that the magnetic head element of the magnetic head slider 2 is spaced apart from the disk 101 surface with a distance insufficient for performing reading/writing of data securely, as shown in the left side of FIG. 11B. Therefore, it is required to reduce the flying height of the magnetic head slider 2 so as to come close to the magnetic disk 101. Accordingly, the map data is formed to set the height H of the actuator 3 to be $H_3$ which is higher than the height h1 of the shallow recess plane 23, as shown in FIG. 9C. Further, in the case of Vr>10.5 mV, the output voltage is too large, so it is assumed that the magnetic head element of the magnetic head slider 2 is positioned at a distance close to the disk 101 surface, as shown in the left side of the FIG. 11C. Therefore, it is required to fly the magnetic head slider 2 so that the tip part thereof is spaced apart from the disk 101. Accordingly, the map data is formed to set the height H of the actuator 3 to be $H_2$ which is higher than the height $h_0$ of the main recess plane 22 but is lower than the height $h_1$ of the shallow recess plane 23, as shown in FIG. 9B.

Further, in the case of 9.5 mV$\leq$Vr$\leq$10.5 mV, appropriate reading/writing of data is realized at the flying position, so it is considered that the height of the actuator 3 in an extension/contraction direction is $H_1$ which is lower than the height $h_0$ of the main recess plane 22 as shown in FIG. 9A. Accordingly, it is set to keep such a height in the map data. If the actual height of the actuator 3 is different from $H_1$, the height H of the actuator 3 may be finely adjusted based on the height map data so as to be controlled to be set to $H_1$. Further, in the case of the output value being 9.5 mV$\leq$Vr$\leq$10.5 mV, the height map data may be adjusted in the CPU (e.g., the height determining processor 63) such that the current height H of the actuator 3 is set to $H_1$. For example, in the magnetic disk drive 100 after manufactured, the output voltage of a readout signal of data may be measured, and corresponding to the characteristics, the height map data may be created in which the height of the actuator 3 defining the appropriate posture of the magnetic head slider 2 is set to the height H1 of the actuator 3 which is the standard flying position at the time of reading/writing of data, or the height map data may be so modified, and stored on the memory 7.

Note that the value of 9.5 mV$\leq$Vr$\leq$10.5 mV described above is an output voltage of a readout signal in a case where the magnetic head slider 2 is located at a position keeping a sufficient distance for performing reading/writing of data, obtained from experimentations or logical calculations, for example. However, such a value is an example, and the present invention is not limited to this.

Further, the height map data is not limited to a map of the characteristics shown in FIG. 11A. For example, it may have characteristics shown in FIG. 12. That is, the output voltage Vr of a readout signal is Vr<9.5, and the map data is set such that the height of the actuator 3 extends gradually as the voltage falls from 9.5. On the other hand, in the case of 10.5<Vr, the map data is set such that the height of the actuator 3 contracts gradually. Thereby, the height of the actuator 3 is finely adjusted around the appropriate output voltage (9.5 to 10.5 mV), so the flying height of the magnetic head slider 2 is finely adjustable, which realizes a control with high accuracy.

The height determining processor 63 reads the height map data from the memory 7, and determines the control target height of the actuator 3 based on the posture information obtained from the posture information obtaining processor 62. Then, the height determining processor 63 determines an applying voltage value for extending or contracting the actuator 3 to the control target height with reference to applying voltage data, not shown, stored in the memory 7, and notifies the extension/contraction controlling processor 64 of it.

Further, the extension/contraction controlling processor 64 controls the actuator 3 to extend or contract based on the applying voltage value corresponding to the height of the actuator 3 notified from the height determining processor 63. Then, as described above, when notified from the slider operation obtaining processor 61 that it is the time of loading or unloading, the extension/contraction controlling processor 64 controls the actuator 3 to contract. Further, when notified from the slider operation obtaining processor 61 that it is the time of reading/writing data or standby, the extension/contraction controlling processor 64 controls the actuator 3 to extend or contract corresponding to each notification as described above.

(Operation)

Next, the operation of the magnetic disk drive 100 in the present embodiment, in particular, the posture control operation of the magnetic head slider 2 will be explained with reference to a flowchart shown in FIG. 13. Here, controlling of extension/contraction of the actuator 3 at the time of reading/writing of data will be explained. That is, with the operation of steps S3 and S4 shown in FIG. 8 explained in the embodiment 2, explanation will be given for an operation of controlling the flying height of the magnetic head slider 2 in a state of flying at the standard flying position which is a position for reading/writing data.

First, when a signal to perform reading/writing processing of data to the disk 101 is detected in the magnetic head slider 2 (positive determination in step S101), the height H of the actuator 3 is controlled to be $H_1$ so as to obtain the flying height enabling reading/writing of data (step S102). Then, in a posture information detecting device such as a read/write circuit 105, the output voltage Vr of a readout signal is detected regularly (step S03).

Then, the output voltage Vr is checked whether it is 9.5V≦Vr≦10.5 mV (step S104), and if it is in the range (positive determination in step S104), a control is performed so as to keep the height H of the actuator 3 to be $H_1$, or an extension/contraction control is not performed while the height H is kept at $H_1$ (to step S109).

In step S104, if Vr<9.5 mV, the height map data is read out from the memory 7, and based on the detected Vr and the height map data, a control target height of the actuator 3 in an extending/contracting direction is determined (step S105). In this case, since the output voltage value is low, a control as shown in FIG. 11B is required. That is, since it is expected that the tip part of the magnetic head slider is at a position spaced apart from the magnetic disk 101 due to any reason, it is required to reduce the flying height of the magnetic head slider 2 and to make the posture angle steeper so as to make the tip part closer to the disk 101. Accordingly, a control target height is determined so as to set the height H of the actuator 3 to $H_3$. Then, an applying voltage value required for extending the actuator 3 to have the determined control target height is determined with reference to the applying voltage data in the memory 7, and the value is notified to the extension/contraction controlling processor 64.

Figure 11C:
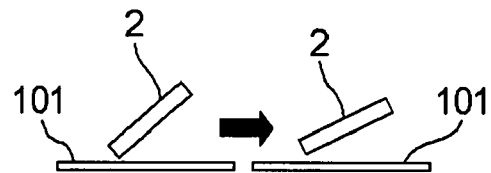

Further, in step S104, if 10.5 mV<Vr, a control target height of the actuator 3 is determined similarly. In such a case, since the output voltage value is high, a control as shown in FIG. 11C is required. Consequently, a control target height is determined so as to set the height H of the actuator 3 to $H_2$ (step S107). Since it is expected that the tip part of the magnetic head slider 2 is too close to the magnetic disk 101 due to any reason, it is required to increase the flying height of the magnetic head slider 2 and to make the posture angle gentler so as to make the tip part apart from the disk 101. Then, an applying voltage value for controlling the actuator 3 to have the determined control target height is determined with reference to the applying voltage data, and the value is notified to the extension/contraction controlling processor 64.

Then, upon receiving a notification of the applying voltage value to the actuator 3 as described above from the height determining processor 63, the extension/contraction controlling processor 64 outputs an instruction to apply the voltage for extending/contracting the actuator 3 via the positioning control circuit 112 or the like (step S106, step S108, extension/contraction controlling step). Thereby, the actuator 3 extends or contracts actually, which enables to control the flying height and the posture angle of the magnetic head slider 2.

Thereafter, as long as reading/writing operation of data is continued by the magnetic head slider 2, control processing of the flying height and the posture angle of the magnetic head slider 2 is repeated as described above (positive determination in step S109). Thereby, the posture of the magnetic head slider 2 can be kept constant near the disk 101 with an appropriate distance, so it is possible to perform reading/writing of data stably with high accuracy. Along with it, it is also possible to suppress a clash caused due to the distance between the magnetic head slider 2 and the disk 101 being too close.

On the other hand, when the slider operation obtaining processor 61 detects that reading/writing operation ends (negative determination in step S109), the slider operation obtaining processor 61 notifies the extension/contraction controlling processor 64 of it. Then, in order to fly the magnetic head slider 2 at maximum so as to be in a standby state in the air, an extension/contraction control is performed to set the height H of the actuator 3 to $H_0$ in the extension/contraction controlling processor 64 (step S110).

(Modification)

Although, in the configuration described above, a method of detecting the output voltage value of a readout signal has been exemplary shown as a method of detecting posture information indicating the posture of the magnetic head slider 2, and circuits for detecting the output voltage value have been explained as posture information detecting device, the posture information detecting device are not limited to them. Another exemplary configuration of the posture information detecting device will be shown below.

For example, assuming that strain of the gimbal part 41 is posture information, and a strain detecting device for detecting the strain is provided to the gimbal part 41 so as to work as a posture information detecting device. Since the magnetic head slider 2 is mounted on the gimbal part 41, the strain of the gimbal part 41 is information closely related to the posture angle, whereby it can be used as posture information. Corresponding to this, a map showing the relationship between the strain of the gimbal part 41 and the control target height of the actuator 3 in an extending/contracting direction considering the posture of the magnetic head slider 2 corresponding to the strain value is set beforehand through experimentations or calculations, and the map is stored on the memory 7. Thereby, it is possible to determine the control target height of the actuator 3 with reference to the map based on the strain value detected so as to control the posture of the magnetic head slider similarly to the above description.

As another example, an image obtaining device for obtaining images of the magnetic head slider 2 may be used as a posture information detecting device. In such a case, the posture angle in a pitch direction of the slider 2, for example, is detected from an image of the magnetic head slider 2, and the control target height of the actuator 3 is determined with reference to a map showing the height of the actuator 3 set corresponding to the posture angle. In this way, it is also possible to perform posture control similarly to the above description.

Note that the posture information detecting device described above is an example, and a method for controlling extension/contraction of the actuator corresponding to the posture information is not limited to the method described above.

Embodiment 4

Next, a fourth embodiment of the present invention will be explained with reference to FIGS. 14A to 21. In the present embodiment, the configuration and the operation in which a readout signal is detected by the magnetic head slider, and based on the readout signal, a flying state of the magnetic head slider with respect to the magnetic disk, as described above, will be explained in more detail. Further, another configuration and operation for controlling the flying height of the magnetic head slider thereafter, corresponding to the flying state of the magnetic head slider detected, will be explained.

Figure 14A:
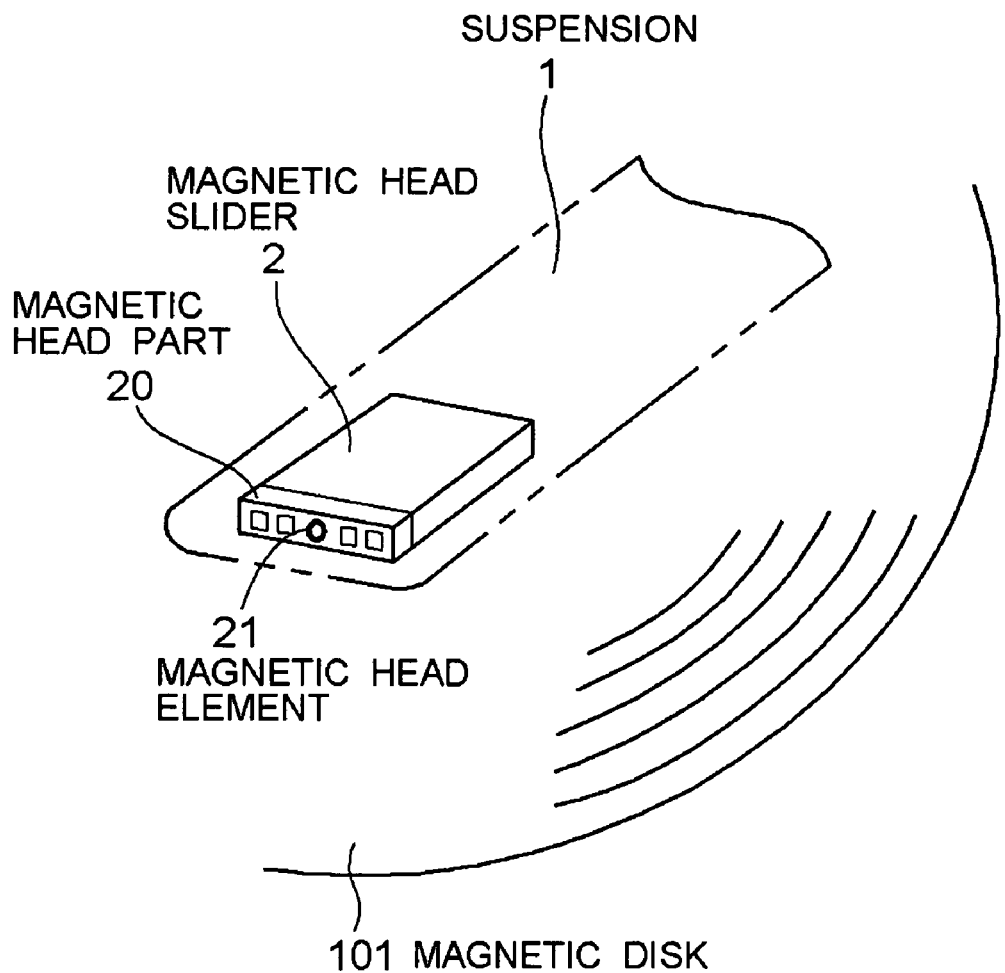
Figure 14B:
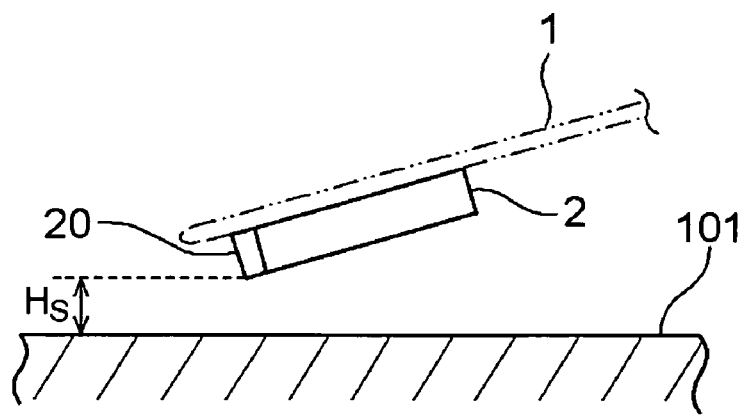
Figure 15:
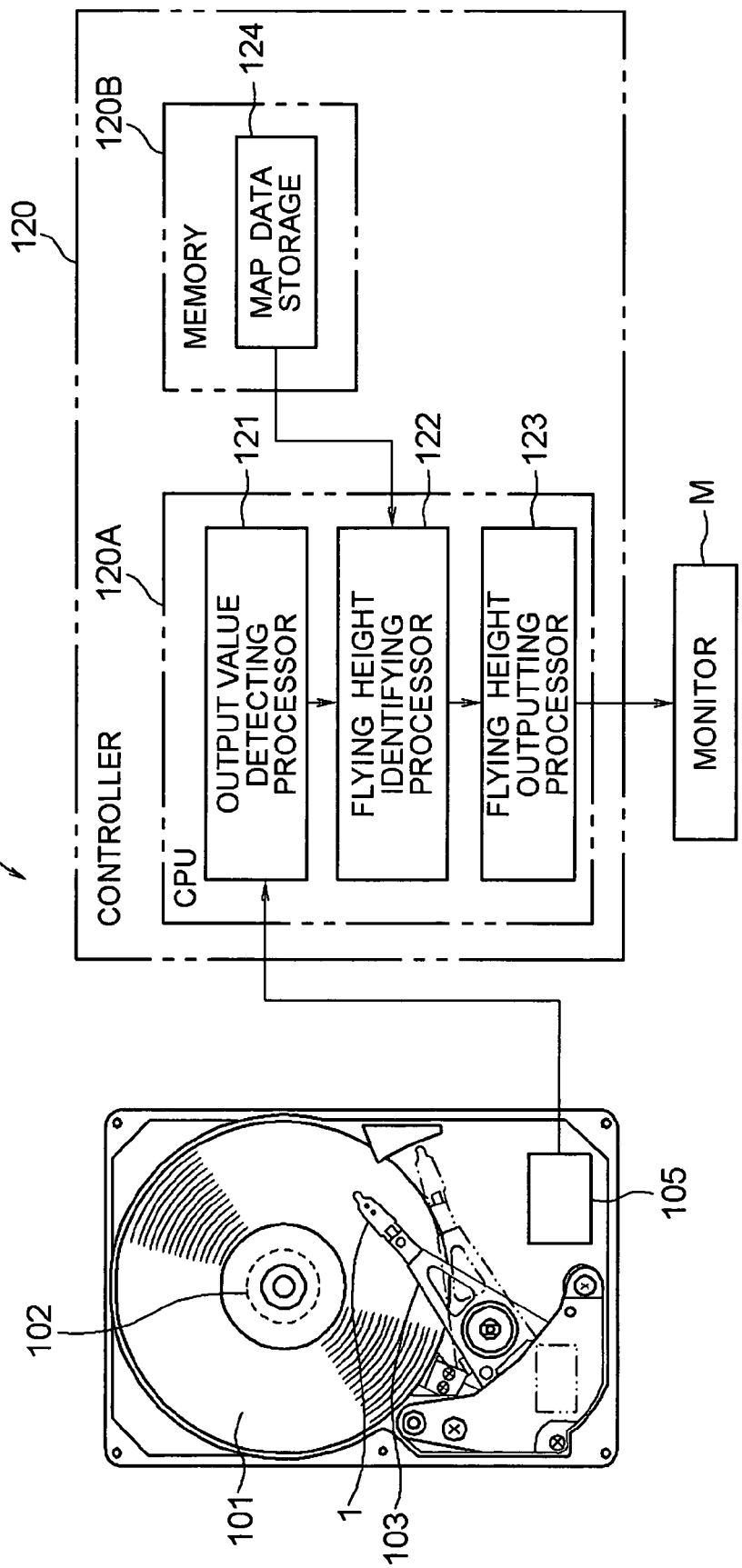
FIG. 15 is a diagram showing the configuration of a magnetic disk drive in an embodiment 4.
Figure 16:
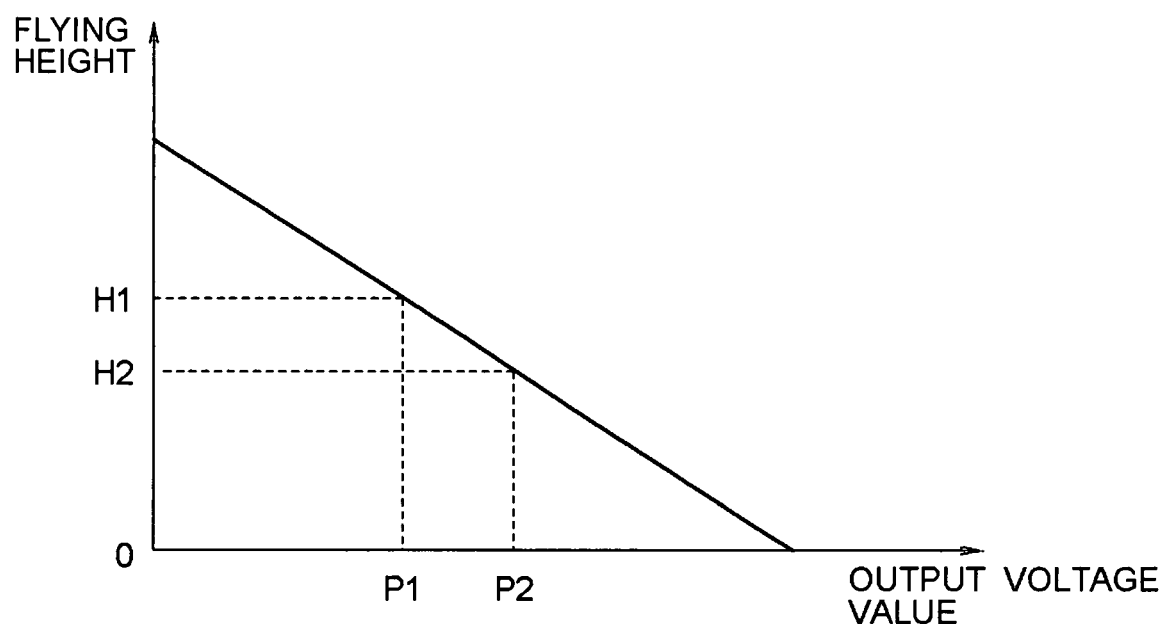
FIG. 16 is a graph showing exemplary data stored on the memory disclosed in FIG. 15.
Figure 17:
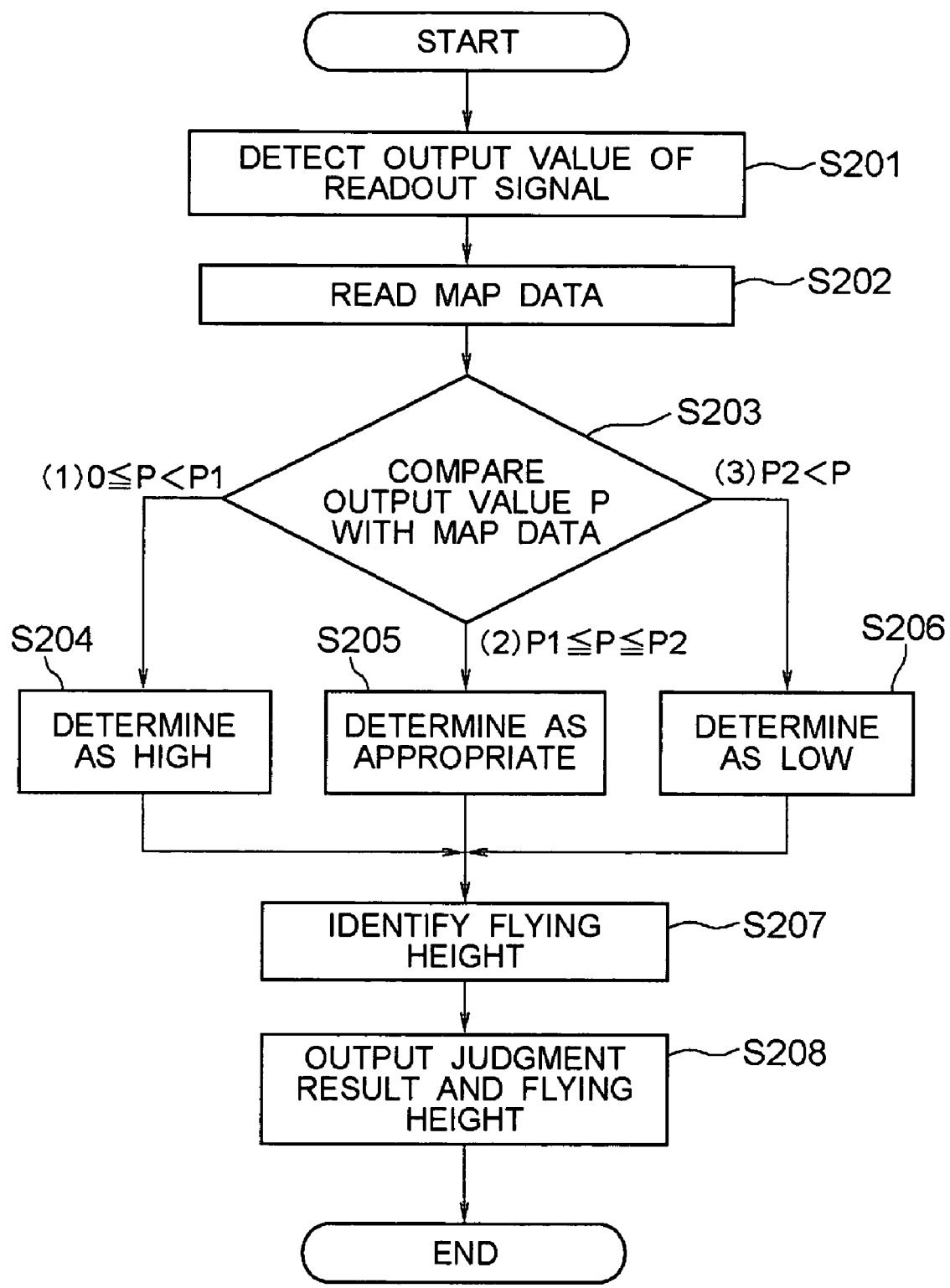
FIG. 17 is a flowchart showing operation of the magnetic disk drive in the embodiment 4.
Figure 18A:
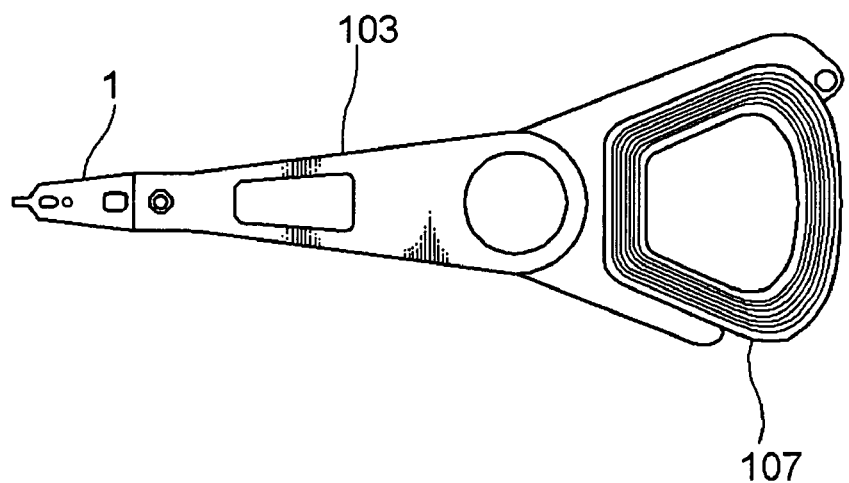
Figure 18B:
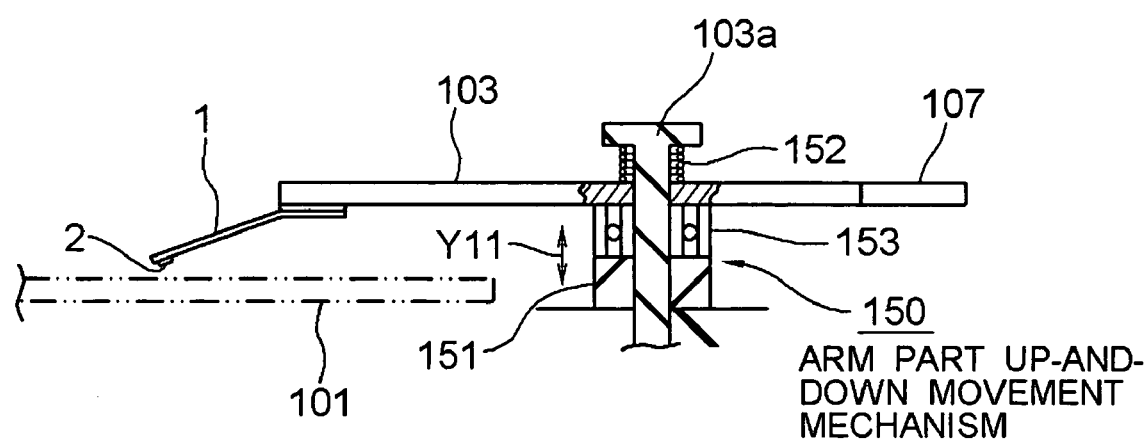
Figure 19:
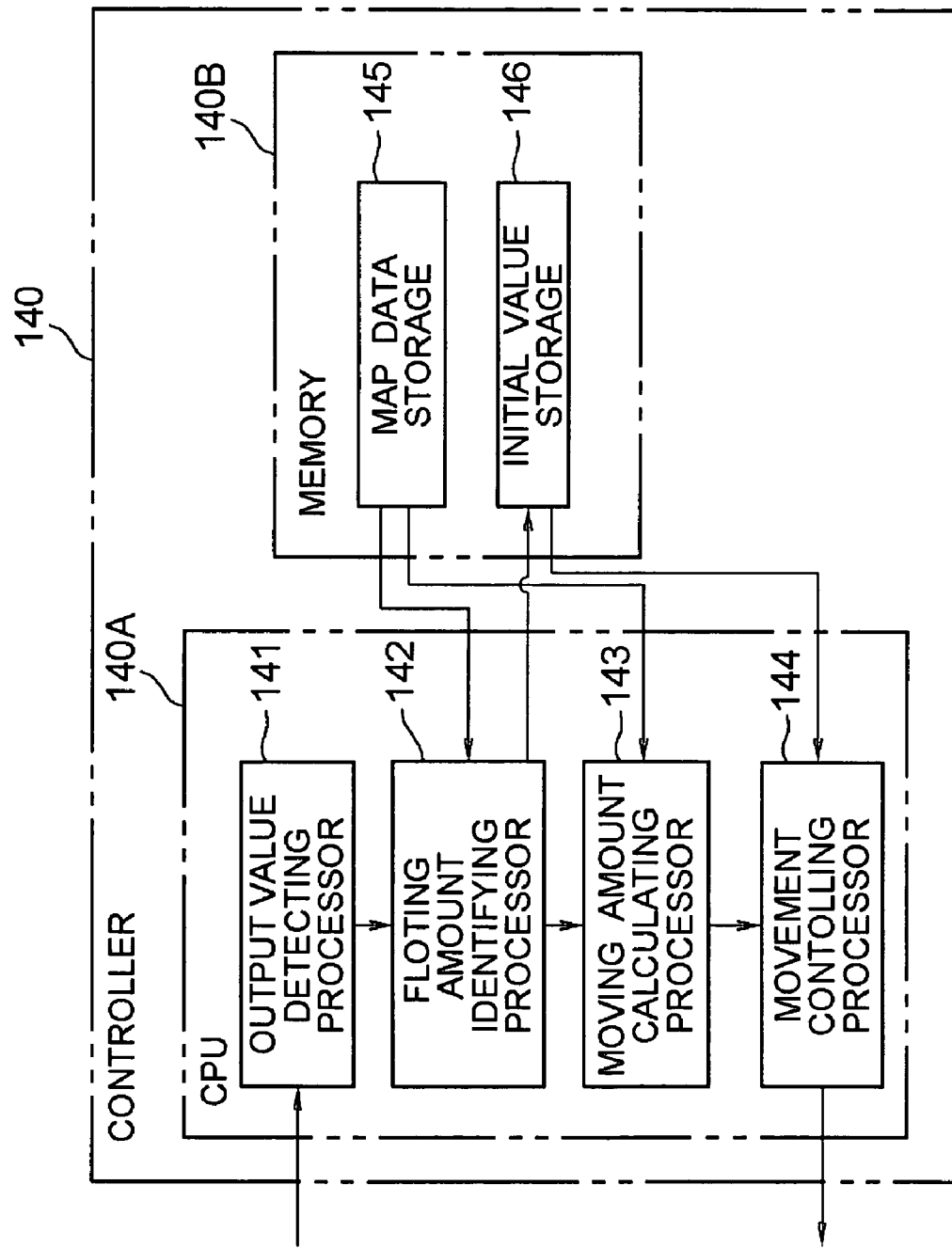
FIG. 19 is a functional block diagram showing the configuration of a controller mounted in the magnetic disk drive in the embodiment 4.
Figure 20:
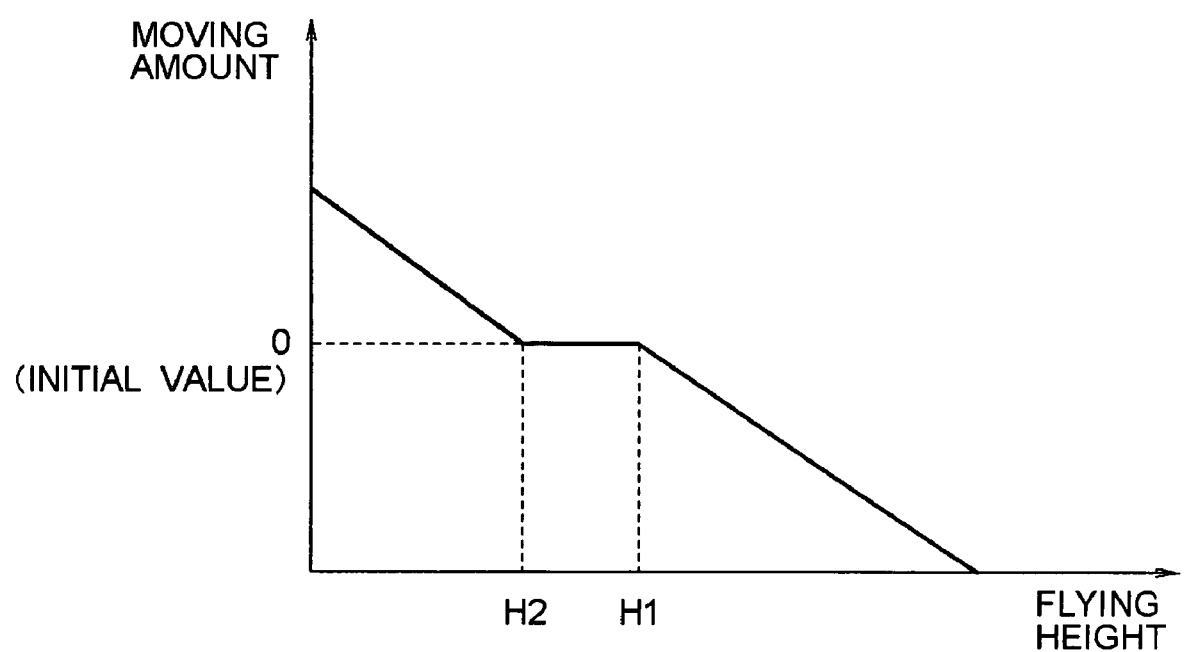
FIG. 20 is a graph showing exemplary data stored on the memory disclosed in FIG. 19.
Figure 21:
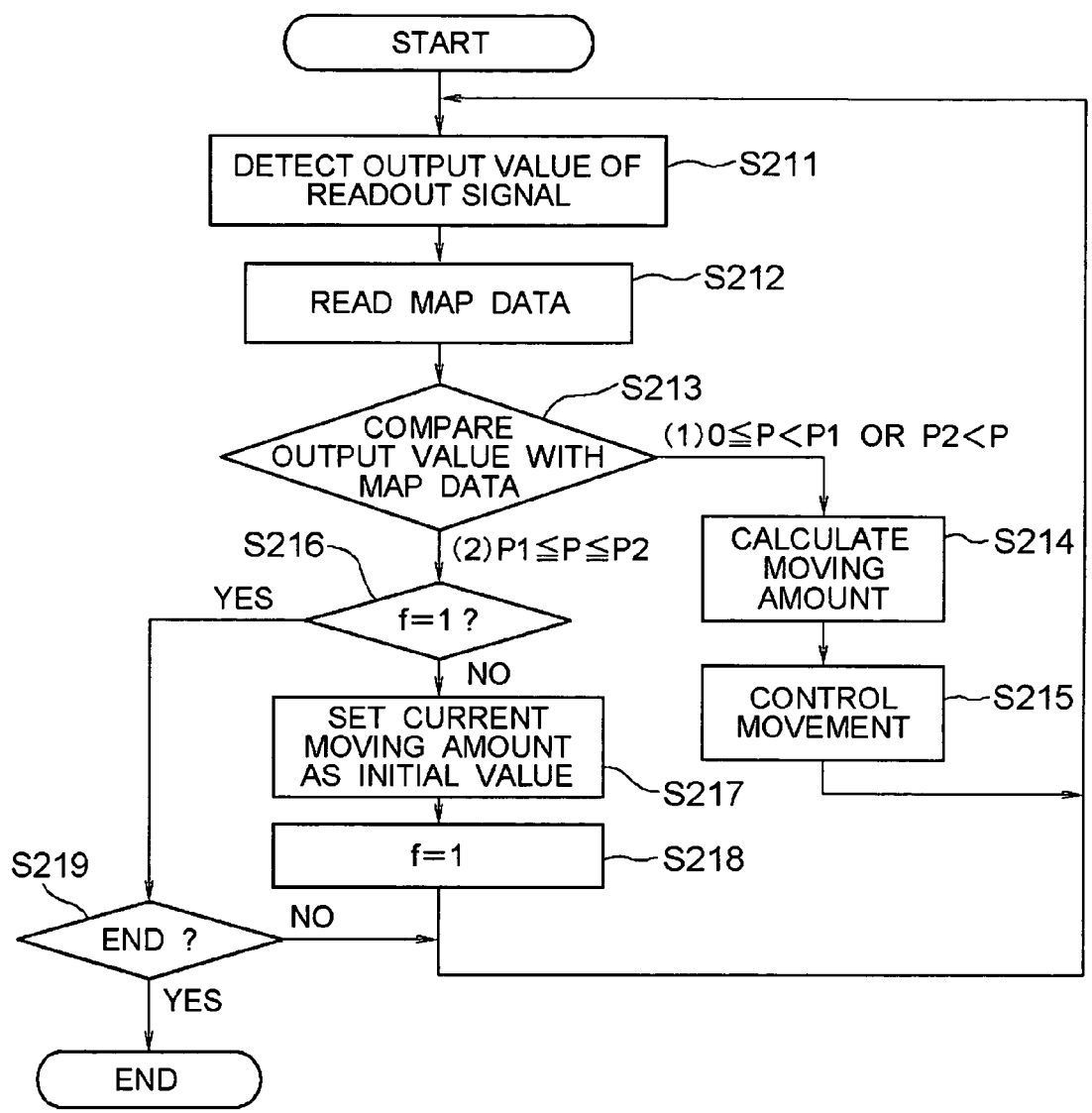
FIG. 21 is a flowchart showing operation of the magnetic disk drive in the embodiment 4.

FIGS. 14A and 14B illustrate a flying state of the magnetic head slider. FIG. 15 is a diagram showing the configuration of the magnetic disk drive, and FIG. 16 is a graph showing an example of data stored in the magnetic disk drive. FIG. 17 is a flowchart showing the operation of the magnetic disk drive. FIGS. 18A and 18B show the configuration of a magnetic head assembly in the present embodiment. FIG. 19 is a functional block diagram showing the configuration of a controller which is a part of the configuration of the magnetic disk drive in the present embodiment. FIG. 20 is a graph showing an example of data stored in the magnetic disk drive. FIG. 21 is a flowchart showing the operation of the magnetic disk drive.

(Configuration)

The overall configuration of the magnetic disk drive 100 in the present invention is almost similar to that of a typical magnetic disk drive. That is, as shown in a schematic diagram of the magnetic disk drive 100 in FIG. 15, the magnetic disk drive 100 mainly includes the magnetic disk 101, the spindle motor 102 for rotationally driving the magnetic disk 101, the magnetic head slider 2 for performing reading/writing of data to the magnetic disk 101, the suspension 1 which is a magnetic head assembly for holding the magnetic head slider 2 at the tip part thereof, and the arm part 103 for supporting and driving the suspension 1.

Further, the magnetic disk drive 100 also includes: an arm drive circuit (not shown) for driving the arm part 103 so as to cause the magnetic head slider 2 located at the tip part thereof to reciprocally rotate along the disk surface; a read/write circuit 105 for performing reading/writing of data to the magnetic disk 101 via the magnetic head slider 2; and a controller 120 (controlling unit) for controlling the overall operation of the magnetic disk drive 100.

<Magnetic Head Slider>

The magnetic head slider 2 mounted at the tip part of the suspension 1, which is a magnetic head assembly in the present embodiment, will be explained in detail with reference to FIGS. 14A and 14B. FIG. 14A is a schematic diagram showing a state where the magnetic head slider 2 is loaded on the magnetic disk 101, and FIG. 14B is a view seen from the side thereof.

As shown in FIG. 14A, the magnetic head slider 2 is provided with the magnetic head part 20 mounted at the tip part thereof, and at the center of the magnetic head part 20, there is formed a magnetic head element 21 for performing reading/writing of data to the magnetic disk 101, facing the magnetic disk 101. Note that a reading/writing portion of the magnetic head element 21 which actually performs reading/writing of data is formed on a surface, facing the magnetic disk 101, of the magnetic head part 20 (see FIG. 7A).

The magnetic head slider 2 mounted on the suspension 1 is disposed in a state where the tip thereof flies slightly from the surface of the magnetic disk 101, and performs reading/writing of data with respect to the magnetic disk, as shown in FIG. 14B. The flying height of this time is shows as the reference sign Hs. The present invention is intended to detect the flying height Hs. However, the flying height Hs to be detected is not strictly limited to the position shown. Note that the present invention is not necessarily limited to detecting the flying height, but may detect whether the magnetic head slider 2 flies or not, whether it flies at an appropriate flying position, or the like.

Although the suspension 1 is shown as a plate member in FIGS. 14A and 14B, it is actually composed of a metallic flexure having the elasticity on which the magnetic head slider 2 is mounted, a metallic load beam having the elasticity for fixing and supporting the flexure, and a metallic base plate provided on the base part of the load beam, and the base plate is fixedly supported by the arm part 103 disclosed in FIG. 15. Further, a face of the flexure, on which the magnetic head slider is mounted, has a gimbal part with the spring characteristics, which is controlled such that the posture of the magnetic head slider 2 flying above the magnetic disk surface becomes stable. However, this configuration is same as that of a typical suspension 1, so the detailed explanation is omitted.

<Controller>

Next, the configuration of the controller 120 for controlling the operation of the magnetic disk drive 100 will be explained. The controller 120 includes a CPU (120A) for controlling the operation of each component of the whole drive, and a memory (120B) such as an EEPROM on which data used for controlling by the CPU is stored. Further, although not shown, the controller 120 is so configured to include: a spindle motor control circuit for controlling the rotational state of the spindle motor 102 for rotationally driving the disk 101, according to an instruction from the CPU (120A); a positioning control circuit for controlling the arm driving circuit for positioning the magnetic head slider 2; a data control circuit for controlling data to be written onto or read out from the magnetic disk 101; and a signal modulation circuit for modulating data to be written onto or read out from the magnetic disk 101 so as to enable the data to be exchanged with the magnetic disk 101. Hereinafter, the configuration of the CPU (120A) will be mainly described in detail.

In the CPU (120A), a program for detecting flying state of the magnetic head slider, stored and prepared beforehand in a storage such as the memory (120B), is installed, whereby there are constructed an output value detecting processor 121 (readout signal detecting device) for detecting, by the magnetic head slider 2, the output voltage value of a reproduction signal from the magnetic disk 101; a flying height identifying processor 122 (flying state identifying device) for identifying the flying state of the magnetic head slider 2 with respect to the magnetic disk 101 based on the output voltage value of the readout signal; and a flying height outputting processor 123 for outputting the identified flying state to an outside monitor M. Of course, there are also constructed other processors for performing reading/writing of data to the magnetic disk 101 and functions of controlling the respective circuits in the CPU (120A). However, as for functions provided in a typical magnetic disk drive, the detailed explanation is omitted. Hereinafter, each processor mentioned above will be explained in detail.

The output value detecting processor 121 detects an output voltage value of a readout signal readout from the magnetic disk 101 in the magnetic head element 2A. At this time, the output voltage value of the readout signal is transmitted from the magnetic head slider 2 to the read/write circuit 105 via a read trace or a flexible substrate not shown. From these circuits and the like, the output value detecting processor 121 obtains the output voltage value. Accordingly, the circuits described above also serve as readout signal detecting device for detecting the output voltage value of the readout signal by the magnetic head slider 2. However, the readout signal detecting device may be realized by adding a new detecting device such as a sensor or a circuit. Further, a readout signal detected by the readout signal detecting device is not necessarily limited to the output voltage value of the readout signal, but may be a signal corresponding to the readout signal from the magnetic disk 101. For example, it may be a magnetic signal before converted into an electric signal.

The flying height identifying processor 122 has a function of identifying the flying height of the magnetic head slider 2 with respect to the magnetic disk 101, based on the output voltage value of the readout signal detected and map data stored on a map data storage 124 of the memory (120B). Here, the map data will be described in detail with reference to FIG. 16. As shown in FIG. 16, the map data is data indicating the relationship between the output voltage value of a readout signal and the flying height of the magnetic head slider, which is defined beforehand through experimentations or logical formulas. As a characteristic of the data, it is so set that the flying height becomes larger as the output voltage value of the reproduction signal is smaller, and the flying height becomes smaller as the output voltage value is larger. This is based on the fact that the magnetic head element 2A comes closer to the data recording surface of the magnetic disk 101 as the flying height of the magnetic head slider 2 decreases, whereby a high output value is obtained. With reference to such map data, the flying height identifying processor 122 identifies the flying height corresponding to the output value detected, and notifies the flying height outputting processor 123 of it.

In the map data, output values P1 and P2 (P1<P2) and flying heights H1 and H2 (H2<H1) corresponding thereto have been set beforehand as shown in FIG. 16. P1 and P2 are the lower limit vale and the upper limit value which are judged that reading/writing of data can be performed appropriately through experimentations or the like, respectively. Accordingly, if an output voltage value P of the readout signal detected is in this range (P1$\leq$P$\leq$P2), the flying height H of the magnetic head slider 2 is in the range of H2$\leq$H$\leq$H1, whereby it is assumed to be an appropriate flying height. Along with it, the flying height identifying processor 42 has a function of performing not only identifying the detailed flying height, but also judging whether the flying height is "appropriate or not", and notifying the flying height outputting processor 43 of the result. More specifically, the flying height identifying processor 42 has a function of judging it is "appropriate" if P1$\leq$P$\leq$P2, as a result of comparing the output value P with the map data. Further, the flying height identifying processor 42 has a function of judging it is "higher than the appropriate flying height" for performing appropriate reading/writing of data if 0$\leq$P$\leq$P1, and judging it is "lower than the appropriate flying height" if P2<P.

The memory (120B) may store reference data which has been prescribed beforehand, other than the map data described above, such as an appropriate range of the output voltage value (only P1 and P2 which are lower limit and upper limit of the range). In such a case, the flying height identifying processor 122 may compare the output voltage value detected with the range of the reference data stored, and determine whether the output voltage value is in the range or not, and according to it, only judge "whether the flying height is appropriate or not" and notify the flying height outputting processor 123 of the judgment result.

Then, the flying height outputting processor 123 outputs the flying height specified as described above and the judgment result of whether the flying height is appropriate or not, to the outside monitor M connected. Note that the data to be outputted may be either one of the flying height and the judgment result.

In the case that the readout signal detected is not the output voltage value but another signal as described above, map data and reference data corresponding thereto are set beforehand.

(Operation)

Next, the operation of the magnetic disk drive 100 in the present embodiment will be explained with reference to a flowchart shown in FIG. 17. Here, explanation will be given on the premise that the flying height of the magnetic head slider is detected after the magnetic disk drive 100 is manufactured but before shipped to thereby perform quality inspection of the product. However, the detecting operation of the flying height is not limited to be performed in the situation described above.

In the present embodiment, the magnetic disk drive 100 is set beforehand such that when power is inputted for the first time, flying height detecting operation is performed automatically in the controller 120 (firmware). However, the magnetic disk drive 100 may be set such that flying height detecting operation starts upon receiving an instruction from outside equipment.

First, an inspector connects a predetermined terminal of the magnetic disk drive 100 to the monitor M, and sets such that the detection result of the flying height is outputted. Then, the inspector inputs power to the magnetic disk drive 100. Then, in the output value detecting processor 121, the output voltage value of a readout signal read out by the magnetic head element 20 of the magnetic head slider 2 is detected (step S201), and the detected output voltage value is notified to the flying height identifying processor 122.

Next, in the flying height identifying processor 122, map data is read out from the map data storage 124 (step S202), and the detected output voltage value P and the map data are compared (step S203). That is, the detected output voltage value P is checked whether it is in between P1 and P2 on the map data. As a result, if 0$\leq$P$\leq$P1 (proceed to (1) in step S203), the flying height of the magnetic head slider 2 is judged as "too high" for performing appropriate reading/writing of data (step S204). On the other hand, if P2<P (proceed to (2) in step S203), it is judged as "too low" (step S206). If P1≦P≦P2, it is judged as "appropriate" (step S205).

Further, in the flying height identifying processor 122, a flying height corresponding to the output voltage value detected based on the map data is also identified (step S207). Then, the judgment result and the flying height are notified to the flying height outputting processor 123.

The flying height outputting processor 123 receiving the notification outputs the judgment result and the flying height to the monitor M connected with the magnetic disk drive 100 (step S208). Then, the quality of the magnetic disk drive 100 is identified by an inspector viewing the output result, and it is determined whether it can be shipped or not as a product. For example, the magnetic disk drive 100 judged as having "appropriate flying height" is shipped. On the other hand, a drive judged as inappropriate is discarded as a defective product, or is moved to a step of adjusting the suspension 1 so as to perform modification of the flying height of the magnetic head slider 2. Even in the case of an appropriate flying height, if the detected value of the flying height is a value near P1 or P2, a judgment of performing the inspection again can be made.

Although an example in which the operation described above is performed at the time of shipping has been shown, it may be activated when performing an operational check of the magnetic disk drive 100. Alternatively, it may be activated when the magnetic disk drive 100 is used generally as described in the following embodiment, and the result may be displayed on the computer incorporated. Thereby, a fault of the magnetic disk drive 100 can be predicted from the result, so it is possible to take such an action as taking a backup immediately.

In the description above, an example in which a configuration to enable the magnetic disk drive 100 to detect the flying height of the magnetic head slider 2 by itself is incorporated in the magnetic disk drive 100 has been shown. However, the present invention is not limited to this. It may be realized in an outside device connectable with the magnetic disk drive 100. In such a case, it can be realized with a slider flying height detecting device, which is an outside device, configured to include a connecting terminal for detecting a readout signal from the magnetic disk drive 100, and components (CPU (120A) and memory (120B)) provided in the controller 120 shown in FIG. 2 for processing the signal and identifying the flying state, and a monitor display for outputting the result of detected flying state.

Next, the configuration and operation for controlling, after detecting the flying height of the magnetic head slider 2, the flying height to be appropriate in the magnetic disk drive 100 will be explained in detail.

(Configuration)

The overall configuration of the magnetic disk drive 100 is almost similar to that of the embodiments described above. Accordingly, the magnetic disk drive 100 has a configuration (e.g., output value detecting processor 141 and flying height identifying processor 142) to identify the flying height of the magnetic head slider 2 as described above, and further, includes the following configuration.

<Magnetic Head Assembly>

The basic configuration of the magnetic head assembly in the present embodiment adopts a typical configuration. As shown in a plan view shown in FIG. 18A, the magnetic head assembly includes the magnetic head slider 2, the suspension 1 for holding the magnetic head slider 2 at the tip part thereof, the arm part 103 for supporting and driving the suspension 1, and a voice coil motor 107 for driving the arm part 103.

FIG. 18B shows a partial sectional view of the magnetic head assembly of FIG. 18A, viewed from the side thereof. As shown in FIG. 18B, the magnetic head assembly includes, particularly in the present embodiment, an arm part up-and-down movement mechanism 150 (slider flying height controlling device, slider distance controlling device, suspension distance controlling device) for vertically driving the position in an up and down direction (vertical direction with respect to the magnetic disk 101 surface) of the arm part 103. As shown in FIG. 18B, the arm part up-and-down movement mechanism 150 is composed of: a ball bearing 153 for rotatably supporting an axial member 103a for journaling the arm part 103; an up-and-down movement actuator 151 for moving the bearing 153 in an axial direction of the axial member 103a; and a coil spring 152 interposed between the upper end part of the axial member 103a and the arm part 103. In detail, the up-and-down movement actuator 151 consists of a mechanism for moving the bearing 153 in up-and-down direction by the rotation of a stepping motor fixed to a casing, not shown, of the magnetic disk drive 100, for example. The up-and-down movement actuator 151 is an actuator enabling to change the displacement in an axial direction of the bearing 153 within the range of the prescribed stroke, and to keep the changed position. Further, since the coil spring 152 is interposed between the upper end part of the disc-shaped axial member 103a and the arm part 103, the arm part 103 is in a state of being pressed downward by the restoring force to the compression of the spring 152. Thereby, the arm part 103, that is, the suspension 1 mounted at the tip part thereof, and the magnetic head slider 2 can be moved in an up-and-down direction along an axial direction of the axial member 103a, and by the downward pressing force of the coil spring 152, a weight (gram load) of the magnetic head slider 2 with respect to the magnetic disk 101 can be adjusted.

The up-and-down movement actuator 151 is connected to the controller 140, and the operation thereof is controlled by an instruction from a predetermined processor constructed in the CPU (140A). Accordingly, the arm part up-and-down movement mechanism 150 including the up-and-down movement actuator 151 and a predetermined processor serve as slider flying height controlling device.

The example of FIG. 18B shows a case where the arm part up-and-down movement mechanism 150 supports the arm part 103 from the lower position. However, the present invention is not limited to this, and the arm part up-and-down movement mechanism 150 may be installed on the upper part of the arm part 103 and drive so as to control the up and down position of the arm part.

(Controller)

Next, the configuration of the controller 140 for controlling the operation of the magnetic disk drive 100 in the present embodiment will be explained with reference to FIG. 19. In the CPU (140A) of the controller 140, a program for detecting the flying state of the magnetic slider, stored and prepared beforehand in the memory (140B) or the like, is installed, whereby there are constructed: an output value detecting processor 141 for detecting the output voltage value of a readout signal from the magnetic disk 101 by the magnetic head slider 2; a flying height identifying processor 142 for identifying the flying state of the magnetic head slider 2 with respect to the magnetic disk 101 based on the output voltage value of the readout signal; a moving amount calculating processor 143 for calculating a displacement for driving the arm part up-and-down movement mechanism 150 corresponding to the identified flying state; and a movement controlling processor 144 for driving the arm part up-and-down movement mechanism 150 based on the calculated displacement. Of course, in the CPU (140A), there are constructed respective processors for performing reading/writing of data to the magnetic disk 101 and functions of controlling respective circuits. However, detailed explanation for functions provided in a typical magnetic disk drive is omitted. Hereinafter, each processor mentioned above will be explained in detail.

The output value detecting processor 141 and the flying height identifying processor 142 have almost similar functions to those described in the above-described embodiments. Together with them, in a map data storage 145 of the memory (140B), map data (hereinafter referred to as a "first map data") indicating the relationship between the output voltage value and the flying height is stored. Note that the flying height identifying processor 142 may not output the result to the outside, but only notify to the moving amount calculating processor 143.

The flying height identifying processor 142 has a function of setting an initial value setting flag f. As a result of detecting the flying height, when the flying height falls in the range of position where an appropriate output voltage value is detectable for the first time, "1" is set to the flag f. Further, the up and down position of the arm part 103 by the arm part up-and-down movement mechanism 150 is stored as an initial value on an initial value storage 146 formed in the memory (140B).

Further, the moving amount calculating processor 143 calculates a displacement (moving amount) for moving the arm part 103 in an up-and-down direction with the arm part up-and-down movement mechanism 150 based on map data (second map data) different from the first map data (see FIG. 16) stored on the map data storage 145. Here, the second map data stored on the map data storage 145 will be explained with reference to FIG. 20. As shown in FIG. 20, the second map data is data indicating the relationship between the detected flying height of the magnetic head slider 2 and the moving amount in an up-and-down direction of the arm part 103 for adjusting the magnetic head slider 2 to have an appropriate flying height. This has been obtained beforehand through experimentations or logical calculations. As shown in FIG. 20, if the flying height Hs is H2≦Hs≦H1, the flying height is appropriate, so there is no need to adjust the flying height of the magnetic head slider 2. Thereby, the moving amount is set to "0". However, if the flying height Hs is lower than H2 which is the lower limit of the appropriate flying height (Hs<H2), the moving amount in a positive direction, that is, upward moving amount of the arm part 103, is set to increases as the flying height Hs decreases. On the other hand, when the flying height Hs is higher than H1 which is the upper limit of the appropriate flying height (H1<Hs), the moving amount in a negative direction, that is, downward moving amount of the arm part 103, is set to increase as the flying height Hs increases. Then, the moving amount calculating processor 143 calculates the moving amount of the arm 103, that is, the driving displacement amount of the arm part up-and-down movement mechanism 150 based on the second map data and the detected output voltage value, and notifies the moving controlling processor 144 of the calculated moving amount.

Further, the movement controlling processor 144 outputs, to the arm part up-and-down movement mechanism 150, a drive signal for driving the arm part up-and-down movement mechanism 150 by the notified moving amount. Thereby, when the flying height of the magnetic head slider 2 is too high, it is controlled to be lowered, and if it is too low, it is controlled so as to fly high. Note that the moving amount controlling processor 144 controls the vertical position of the arm part up-and-down movement mechanism 150 on the basis of the initial value stored on the initial value storage 146 of the memory (140B).

(Operation)

Next, the operation of the magnetic disk drive 100 in the present embodiment will be explained with reference to the flowchart in FIG. 21. Here, explanation will be given for both the case where inspection of the flying height of the magnetic head slider is performed after the magnetic disk drive 100 is manufactured but before shipped, and the inspecting operation of the flying height when used thereafter. The operation shown in FIG. 21 may be performed when it is used by a user for the first time. In the present embodiment, it is also assumed that the magnetic disk drive 100 is so set beforehand that an inspecting operation of the flying height is performed automatically in the controller when power is inputted thereto for the first time.

First, when power of the magnetic disk drive 100 is inputted, in the output value detecting processor 141, the output voltage value of a readout signal read out by the magnetic head element 13 of the magnetic head slider 2 is detected (step S211), and the detected output value is notified to the flying height identifying processor 142. In the initial state, the flag f is set to "0".

Then, in the flying height identifying processor 142, the first map data is read out from the map data storage 145 (step S212), and the detected output voltage value P and the map data are compared (step S213). That is, the detected output voltage value P is checked whether it is in the range between P1 and P2 on the first map data. If 0≦P<P1, or P2<P (proceed to (1) in step S213), the flying height of the magnetic head slider 2 is "too high" or "too low", so a control of the flying height of the magnetic head slider is performed. Therefore, the current flying height is notified to the moving amount calculating processor 143, and in the moving amount calculating processor 143, the second map data is read out from the map data storage 145, and is compared to the flying height notified, whereby the moving amount is calculated (step S214). Then, the calculated moving amount is notified to the movement controlling processor 144, and in the movement controlling processor 144, a drive instruction signal corresponding to the moving amount is outputted to the arm part up-and-down movement mechanism 150 which controls up-and-down movement of the arm part 103 (step S215).

Then, the output vale of the readout signal is detected again (step S211), and the output voltage value P and the first map data are compared similarly to the above description (step S212, step S213). As a result, when P1≦P≦P2 (proceed to (2) in step S213), the flying height is appropriate, so a moving control in an up-and-down direction of the arm part 103 is not performed. Since the flag f is set to "0" which is the initial state (negative determination in step S16), the current driving position of the arm part up-and-down movement mechanism 150, that is, the up and down position of the arm part 103, is stored as an initial value in the initial value storage 146 (step S217), and at the same time, "1" is set to the flag f (step S218).

Then, when the magnetic disk drive is used thereafter, the output voltage value of a readout signal of the magnetic head slider 2 is detected and checked regularly (steps S211 to S213), and when the flying height is inappropriate because the flying characteristics change temporarily for example, an up-and-down movement control of the arm 103 is performed (after negative determination in step S213, step S214 and S215), the magnetic head slider 2 is controlled to have a flying height enabling appropriate reading/writing of data, and is controlled to have a flying height having no possibility of clash. On the other hand, when the flying height is appropriate (positive determination in step S216), setting of the vertical movement position is not performed again if it has already been performed once, and the flying height control is performed until the use of the magnetic disk drive 100 ends (step S219).

With the configuration described above, first, inaccuracy of the flying height due to defective assembly or the like in the manufacturing stage of the magnetic disk drive is corrected based on the readout signal detected, and with an activation when the product is shipped or when the user activated it for the first time, a flying height adjustment of the magnetic head slider 2 is performed automatically. Then, when the flying height changes temporarily on the basis of the set position in an up-and-down direction of the arm part 103, a up-and-down movement control of the arm 103 is performed so as to have an appropriate flying height, whereby stable reading/writing operation of the magnetic head slider 2 can be realized. Since the flag f is in a set state at the time of initial setting, the reference position in an up-and-down direction of the arm part 103 will never be set again, as described above. However, by manipulating a firmware from the outside, it is possible to set the flag f to an initial state and to set the reference position (initial value) again. Further, the flag f may not be set and an up and down position of the arm part 103 providing appropriate flying state may be updated and stored regularly as an initial value.

In the above description, a mechanism is exemplary given in which the suspension 1 is moved in an up-and-down direction with the movement of the arm part 103 in an up-and-down direction, and along with it, the distance of the magnetic head slider 2 to the magnetic disk 101 surface is adjusted. However, the present invention is not necessarily limited to be configured with the mechanism described above. Any configuration capable of moving the arm part 103 in an up-and-down direction and keeping the moved state may be acceptable. Further, a mechanism for moving the suspension 1 such as a flexure or a load beam in an up-and-down direction directly may be provided, or a mechanism for moving the magnetic disk 101 itself in an up-and-down direction so as to move the magnetic head slider 2 in an up-and-down direction.

Embodiment 5

Figure 22A:
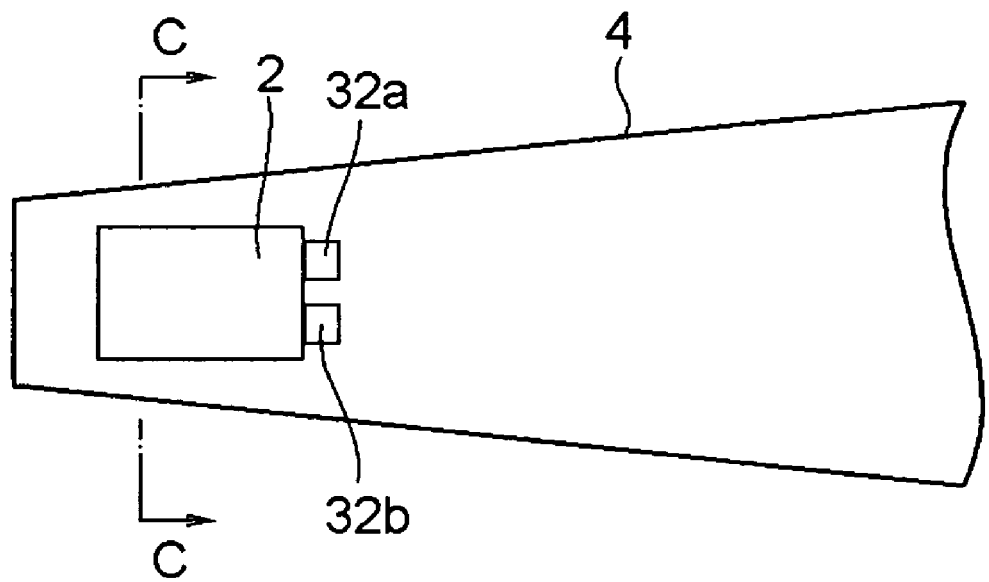
Figure 22B:
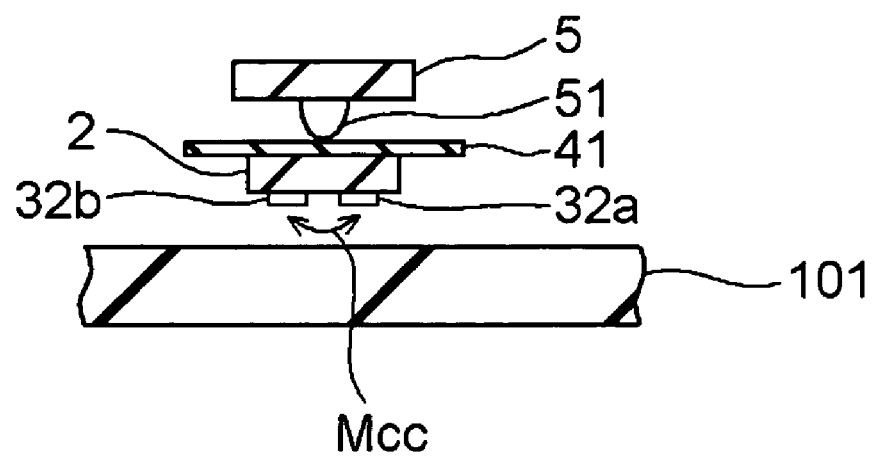
Figure 23:
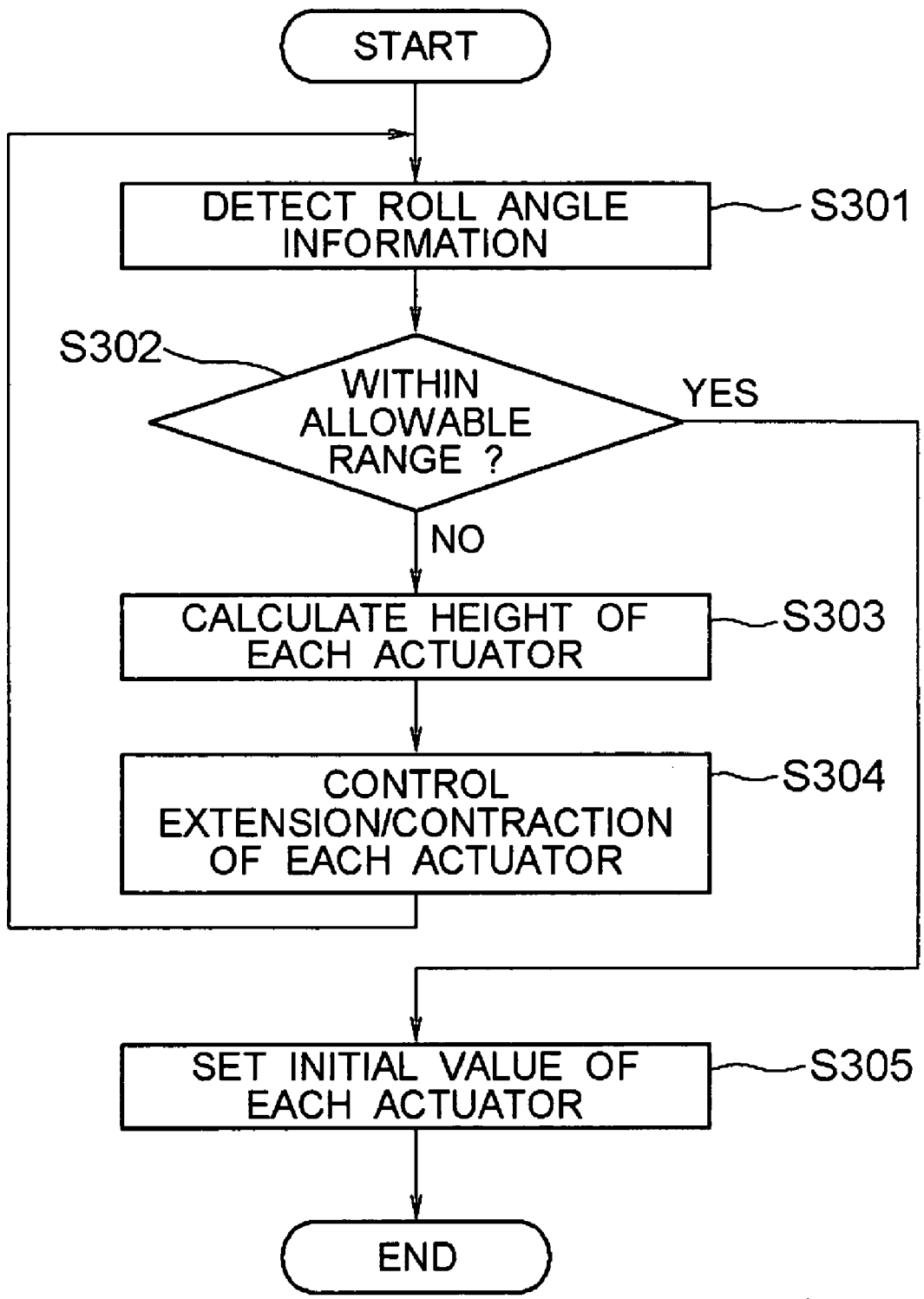
FIG. 23 is a flowchart showing operation of the magnetic disk drive in the embodiment 5.
Figure 24:
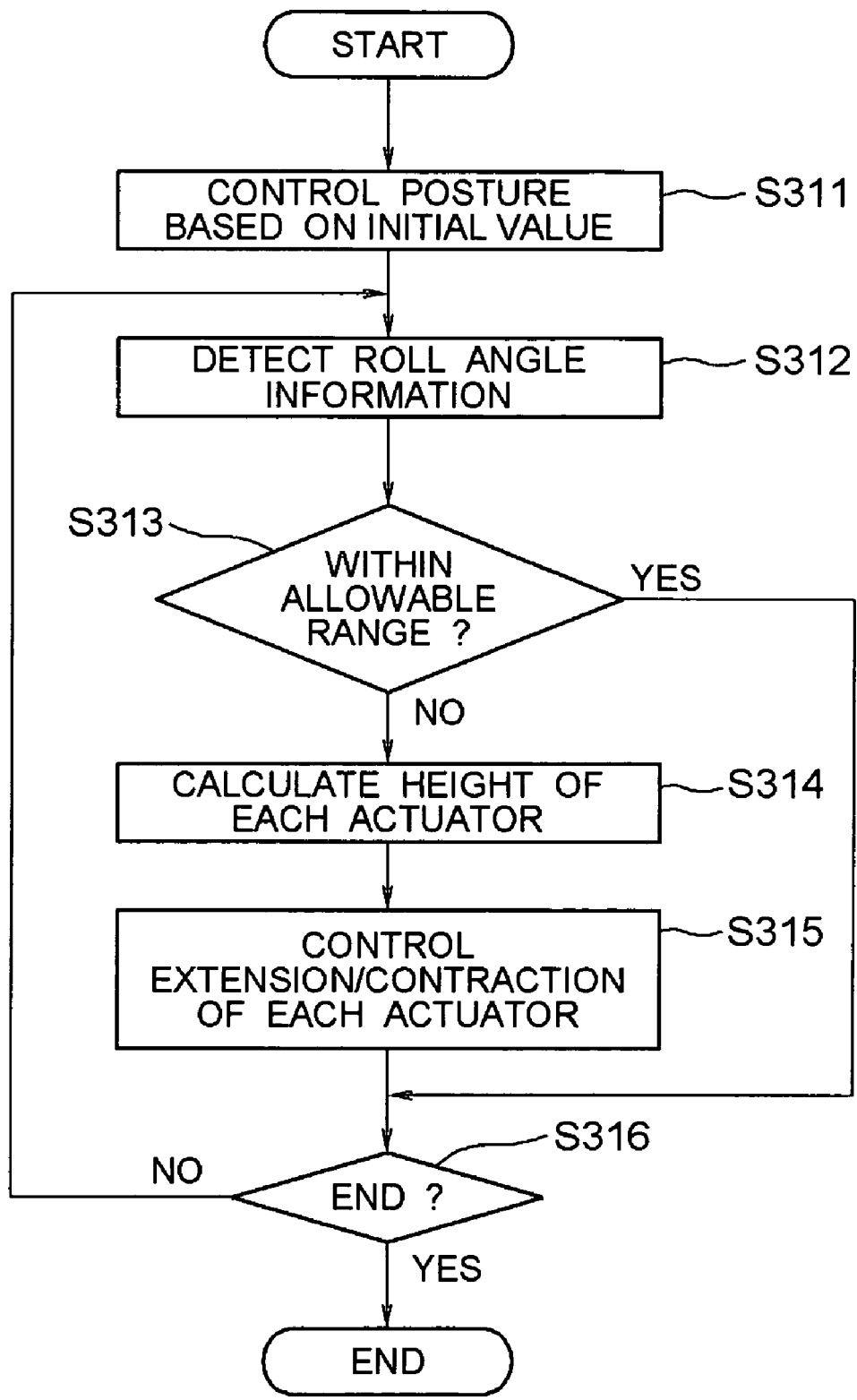
FIG. 24 is a flowchart showing operation of the magnetic disk drive in the embodiment 5.

Next, a fifth embodiment of the present invention will be explained with reference to FIGS. 22A to 24. The present embodiment shows a modification of the invention of controlling the posture of the magnetic head slider shown in the embodiment 1. FIGS. 22A and 22B illustrate the posture of the magnetic head slider in the present embodiment, in which FIG. 22A is a plan view, and FIG. 22B is a sectional view taken along the line C-C in FIG. 22A. FIGS. 23 and 24 are flowcharts showing the operation of the magnetic disk drive in the present embodiment.

(Configuration)

The magnetic disk drive in the present embodiment includes actuators 32a and 32b on the rear end side of the magnetic head slider 2, similar to the embodiment 1. The actuators 32a and 32b are dividedly mounted on the sides of the right-and-left side faces of the magnetic head slider 2. That is, as shown in FIG. 22A, the two actuators are arranged in parallel toward a flowing direction of air flown in between the magnetic disk 101 and the magnetic head slider 2. FIG. 22B is a sectional view taken along the line C-C in FIG. 22A, viewed in a state that the magnetic head slider 2 is positioned on the lower side. In FIG. 22B, the actuators 32a and 32b are in an extended state so as to be shown in the Figure. However, the number of actuators arranged in parallel with respect to the flow of flown air is not limited to two.

The actuators 32a and 32b are formed of piezoelectric ceramics (piezoelectric devices) which are extendable/contractible independently of each other on the basis of the height h from the mounting face, onto the suspension 1, of the magnetic head slider 2 to the surface facing the magnetic disk, similar to the actuator 3 described above. In particular, each actuator 32a or 32b extends or contracts corresponding to the roll which is the posture in a roll direction of the magnetic head slider 2. As an example of information indicating the posture in a roll direction of the magnetic head slider 2, a roll angle with respect to the magnetic disk 101 is used, as described below.

With the configuration described above, the magnetic disk drive 100 includes a roll angle information detecting device for detecting roll angle information which is the posture of the magnetic head slider 2 with respect to the magnetic disk 101. In the CPU 6 mounted in the controller 110, a specific program is incorporated, whereby there are constructed a roll angle information obtaining processor for obtaining the roll angle information from the roll angle information detecting device, and an extension/contraction controlling processor for controlling extension/contraction of each of the heights of the plural actuators 3 independently, based on the roll angle information.

In the roll angle information detecting device, when magnetic head elements are provided on the right and left sides of the tip part of the magnetic head slider 2 for example, inclination in a roll direction of the magnetic head slider 2 with respect to the magnetic disk 101 may be detected, by using detected signals from the both elements. That is, the roll angle information detecting device does not necessarily detect information directly indicating the roll angle with respect to the magnetic disk 101 of the magnetic head slider 2, but detects information indirectly indicating the roll angle, and notifies to the roll angle information obtaining processor in the CPU 6.

Note that the roll angle information detecting device is not limited to detect the posture in a roll direction by the method described above. As described above, the roll angle information detecting device may be configured of a device for obtaining strain of the gimbal part 41 and images of the magnetic head slider 2, and based on the information, it may calculate the roll angle of the magnetic head slider 2.

The roll angle information obtaining processor in the CPU 6 first determines whether the current roll angle is in a predetermined range of acceptable values by using the obtained roll angle information which is posture information in a roll direction of the magnetic head slider 2. Here, acceptable values are values in a range indicating roll angles having no possibility of clash and enabling the magnetic head slider 2 to perform reading and writing stably with high accuracy, which are values defined through experimentations or logical computations.

As a result of determination, if the result is outside the range of allowable values, it is required to change the height of the actuator such that the posture of the magnetic head slider 2 is changed to be in a range of allowable values, and the values are calculated for each actuator. At this time, such a calculating formula is incorporated in the CPU 6 beforehand. For example, a value is calculated so as to contract the actuator mounted on the side face side near the magnetic disk 101 by a predetermined height, and in contrast, a value is calculated so as to extend the actuator on a side far from the magnetic disk 101 by a predetermined height. Then, the calculated heights of each actuator are notified to the extension/contraction controlling processor.

Then, the extension/contraction controlling processor controls to extend or contract by outputting a voltage signal so as to control each actuator to have the calculated height. Then, continuously, the roll angle information is detected and checked whether it is in the allowable range, and if it is not in the range of allowable values, an extension/contraction control of the actuator is performed.

Further, the extension/contraction controlling processor further includes an initial value setting function for setting the height of each actuator, determined as fallen in the allowable range after controlled to extent or contract, as an initial value of the actuator, and storing it on the memory 7. The initial value setting function is executed at the time of inspection when the magnetic disk drive 100 is shipped as a product.

Then, when the magnetic disk drive is activated, a posture control in a roll angle direction is performed as described above, and the height of the actuator 3 is controlled to extend or contract on the basis of the initial value set as described above.

(Operation)

Next, operation of the magnetic disk drive 100 configured as described above will be explained. First, posture control operation of the magnetic head slider 2 will be explained. As described above, a plurality of actuators 3 are provided, so when one of the right and left actuators, for example, an actuator shown by the reference numeral 32a contracts, the amount of the air flown into the contracted actuator side, that is, the right side in FIG. 22B, increases. Thereby, the pressing force pressing the tip part side of the right side of the magnetic head slider 2 becomes stronger, and the rotational force Mcc in a roll direction about the dimple 51 increases. Therefore, it is possible to perform a posture control in a roll direction of the magnetic head slider 2. In other words, when the side of the actuator 32a is near the magnetic disk 101 and a high possibility of clash is detected, it is possible to control the magnetic head slider to be in an appropriate posture by controlling it as described above.

As described above, the actuators 32a and 32b mounted on the right and left sides serve as air flow right-and-left balance regulating device for regulating the right-and-left balance of the air flown in between the magnetic disk 101 and the magnetic head slider 2. Accordingly, in the present embodiment, device for controlling the roll angle of the magnetic head slider 2 are not limited to the actuators 32a and 32b shown in FIGS. 22A and 22B. Any device regulating the amount of flown air of the right and left sides may be used as described above.

Based on the principle described above, operation of the magnetic disk drive will be explained with reference to FIGS. 23 and 24. FIG. 23 is an operation performed when shipping a product.

First, when roll angle information of the magnetic head slider 2 is detected (step S301), based on the value, the current posture is checked whether a roll direction of the magnetic head slider is normal or not. That is, the roll angle information is checked whether it is in an allowable range (step S302).

If it is not in the allowable range (negative determination in step S302), based on the roll angle information detected, the height of each of the actuators 32a and 32b is calculated so as to take a normal posture (step S303), and the height of each of the actuators 32a and 32b is controlled to extend so as to have such a height (step S304). By repeating the processing described above, the roll angle information falls in the allowable range (positive determination in step S302). When the posture of the magnetic head slider 2 becomes normal, the height of each of the actuators 32a and 32b at that time is set as an initial value, and is stored on the memory 7 for example (step S305).

Next, referring to FIG. 24, operation of the magnetic disk drive after shipped and purchased by a user will be explained. First, as described above, the initial value of the height of each of the actuators 32a and 32b, set when shipped, is read out, and the height of each of the actuators 32a and 32b is set to have the value. Accordingly, an extension/contraction control starts on the basis of the value (step S311). Then, roll angle information is detected at a prescribed time interval (step S312), and based on the value, the current posture in a roll direction of the magnetic head slider is checked whether it is normal or not. That is, the roll angle information is checked whether it is in an allowable range (step S313). If it is not in the allowable range (negative determination in step S313), height of each of the actuators 32a and 32b is calculated so as to take a normal posture based on the roll angle information detected (step S314), and the height of each of the actuators 32a and 32b is controlled to extend actually so as to have such a height (step S315). On the other hand, if the roll angle information detected falls in the allowable range (positive determination in step S312), heights of the actuators 32a and 32b are not changed. The above-described operation is performed until drive of the magnetic disk drive ends (step S316). Thereby, the posture in a roll direction of the magnetic head slider 2 is always kept at a posture which is optimum for performing reading/writing of information and capable of suppressing a clash.

As described above, by performing initial setting of the heights of actuators when shipping the product, it is possible to improve inaccuracy in the manufacturing of the suspension 1, for example, and to make quality of the product higher. Further, by controlling the posture in a roll direction when used, it is possible to realize reading/writing processing of signals with higher accuracy, and to suppress occurrence of a clash effectively. This enables to elongate the service life of the product.

As a method of detecting posture information of the magnetic head slider 2, that is, the roll angle information, it may be performed by determining whether a readout signal is detectable appropriately in one magnetic head element. More specifically, it is detected whether the output voltage value of a readout signal is in a range of values set beforehand so as to determine whether the inclination in a roll direction is appropriate or not, and the information about whether it is appropriate or not may be used as roll angle information. If it is determined as appropriate, an extension/contraction control of the actuators 32a and 32b is not performed, and if it is determined as inappropriate, a control is performed to finely adjust the extension/contraction amount of the actuators 32a and 32b until the inclination is determined as appropriate. Thereby, the posture in a roll direction of the magnetic head slider 2 can be controlled appropriately.

Note that in the suspension 1 of the above-described configuration in the present embodiment, a posture control in a pitch direction of the magnetic head slider 2 may be performed as described in the embodiments above.

INDUSTRIAL AVAILABILITY

A magnetic head assembly of the present invention can be mounted on any magnetic disk drive as a magnetic head assembly capable of realizing reading/writing of data with high accuracy and suppressing a clash effectively, and has an industrial availability.

What is claimed is:

1. A magnetic head assembly comprising:
a magnetic head slider configured to read and write information to a magnetic disk which rotates;
a suspension, which supports the magnetic head slider; and
an air flow regulator which regulates an air flow amount that flows in between the magnetic disk and the magnetic head slider along with rotation of the magnetic disk, wherein the magnetic head slider is supported proximate a point corresponding to a dimple provided on the suspension, and is configured to rotate about the dimple in response to the air flow amount, and
wherein the air flow regulator and the magnetic head slider are provided on the suspension, and the air flow regulator is adjacent an air inflow side of the magnetic head slider.

2. The magnetic head assembly as claimed in claim 1, wherein the air flow regulator further comprises an extendable/contractible driving device which extends or contracts on a basis of a height from a mounting face positioned on the suspension to a face facing the magnetic disk.

3. The magnetic head assembly as claimed in claim 2, wherein the extendable/contractible driving device extends or contracts on a basis of a height of a main recess plane of the magnetic head slider.

4. The magnetic head assembly as claimed in claim 2, wherein the extendable/contractible driving device extends or contracts corresponding to a flying height of the magnetic head slider with respect to the magnetic disk.

5. The magnetic head assembly as claimed in claim 2, wherein the extendable/contractible driving device includes a piezoelectric device.

6. A magnetic disk drive comprising the magnetic head assembly as claimed in claim 1.

7. The magnetic disk drive as claimed in claim 6, wherein the air flow regulating device comprises: an extendable/contractible driving device which is provided adjacently on an air inflow side of the magnetic head slider and extends or contracts on a basis of a height from a mounting face positioned on the suspension to a face facing the magnetic disk; and an extension/contraction controlling device for controlling extending/contracting operation of the extendable/contractible driving device.

8. The magnetic disk drive as claimed in claim 7, wherein the extension/contraction controlling device controls the extending/contracting operation of the extendable/contractible driving device on a basis of a height of a main recess plane of the magnetic head slider.

9. The magnetic disk drive as claimed in claim 7, wherein the extension/contraction controlling device controls the extendable/contractible driving device to extend or contract based on posture information indicating a posture of the magnetic head slider with respect to the magnetic disk.

10. The magnetic disk drive as claimed in claim 9, wherein the posture information is a flying height of the magnetic head slider with respect to the magnetic disk.

11. The magnetic disk drive as claimed in claim 9, comprising: a readout signal detecting device for detecting a readout signal from the magnetic disk in the magnetic head slider; and a flying state identifying device for identifying a flying state of the magnetic head slider with respect to the magnetic disk as the posture information, based on the readout signal detected.

12. The magnetic disk drive as claimed in claim 11, comprising a reference data storage device for storing reference data which has been determined beforehand and is compared with the readout signal, wherein the flying state identifying device compares the readout signal detected with the reference data, and according to a comparison result, identifies a flying state of the magnetic head slider as the posture information.

13. The magnetic disk drive as claimed in claim 11, comprising a map data storage device for storing map data indicating a relationship between the readout signal and a flying height of the magnetic head slider, wherein
the flying state identifying device identifies the flying height of the magnetic head slider with respect to the magnetic disk as the posture information, based on the readout signal detected and the map data.

14. The magnetic disk drive as claimed in claim 11, wherein the readout signal is an output voltage value of the readout signal.

15. A posture control method for a magnetic head slider, comprising:
regulating an air flow amount that flows in between a magnetic disk and the magnetic head slider along with rotation of the magnetic disk, corresponding to a posture of the magnetic head slider;
supporting, by a suspension, the magnetic head slider proximate a point corresponding to a dimple provided on the suspension, such that the magnetic head slider is configured to rotate about the dimple in response to the air flow amount; and
regulating the air flow amount between the magnetic disk and the magnetic head slider by an air flow regulator positioned adjacent an air inflow side of the magnetic head slider.

16. The posture control method for the magnetic head slider as claimed in claim 15, comprising:
identifying the posture which is a flying state of the magnetic head slider with respect to the magnetic disk based on a readout signal detected from the magnetic disk in the magnetic head slider.

17. The posture control method for the magnetic head slider as claimed in claim 16, comprising:
comparing the readout signal detected with reference data which has been determined beforehand, and according to a comparison result, identifying the posture which is the flying state of the magnetic head slider.

18. The posture control method for the magnetic head slider as claimed in claim 16, wherein the readout signal is an output voltage value of the readout signal.

19. A posture control method for a magnetic head slider, comprising:
regulating an air flow amount that flows in between a magnetic disk and the magnetic head slider along with rotation of the magnetic disk, corresponding to a driving state of a magnetic disk drive;
supporting, by a suspension, the magnetic head slider proximate a point corresponding to a dimple provided on the suspension such, that the magnetic head slider is configured to rotate about the dimple in response to the air flow amount; and
regulating the air flow amount between the magnetic disk and the magnetic head slider by an air flow regulator positioned adjacent an air inflow side of the magnetic head slider.

20. A magnetic head assembly comprising:
a magnetic head slider configured to read and write information with respect to a magnetic disk which rotates;
a suspension which supports the magnetic head slider; and
an air flow right-and-left balance regulator which regulates a right-and-left balancing of an air flow, that flows between the magnetic disk and the magnetic head slider along with rotation of the magnetic disk, wherein the magnetic head slider is supported proximate a point corresponding to a dimple provided on the suspension, and is configured to rotate about the dimple in response to the air flow amount, and wherein the air flow right-and-left balance regulator and the magnetic head slider are provided on the suspension, and the air flow right-and-left balance regulator is adjacent an air inflow side of the magnetic head slider.

21. The magnetic head assembly as claimed in claim 20, wherein the air flow right-and-left balance regulator includes a plurality of extendable/contractible driving devices which extend and contract on a basis of a height from a mounting face positioned on the suspension to a face facing the magnetic disk and are arranged in parallel with respect to a flowing direction of air that flows into the magnetic head slider.

22. The magnetic head assembly as claimed in claim 21, wherein the plurality of extendable/contractible driving device extend or contract independently corresponding to a roll of the magnetic head slider.

23. The magnetic head assembly as claimed in claim 21, wherein the extendable/contractible driving device includes a piezoelectric device.

24. A magnetic disk drive comprising the magnetic head assembly as claimed in claim 20.

25. The magnetic disk drive as claimed in claim 24, wherein the air flow right-and left balance regulator includes: a plurality of extendable/contractible driving devices which are provided adjacently on an air inflow side of the magnetic head slider, and extend or contract on a basis of a height from a mounting face positioned on the suspension to a face facing the magnetic disk, and are arranged in parallel with respect to a flowing direction of air that flows into the magnetic head slider; and an extension/contraction controlling device for controlling extending/contracting operations of the plurality of extendable/contractible driving devices independently.

26. The magnetic disk drive as claimed in claim 25, wherein the extension/contraction controlling device controls the plurality of extendable/contractible driving devices independently, based on posture information indicating a posture of the magnetic head slider with respect to the magnetic disk.

27. The magnetic disk drive as claimed in claim 26, wherein the posture information is a roll of the magnetic head slider.

* * * * *